United States Patent
Dasher et al.

(10) Patent No.: US 12,436,607 B1
(45) Date of Patent: Oct. 7, 2025

(54) SYSTEMS AND METHODS FOR PROVIDING ENHANCED EXTENDED REALITY INTERACTIONS USING PERSONAL ELECTRONIC DEVICES AS INPUT MECHANISMS

(71) Applicant: Adeia Guides Inc., San Jose, CA (US)

(72) Inventors: Charles Dasher, Lawrenceville, GA (US); Reda Harb, Tampa, FL (US); Jean-Yves Couleaud, Mission Viejo, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/677,541

(22) Filed: May 29, 2024

(51) Int. Cl.
*G06F 3/01* (2006.01)
*G06F 3/14* (2006.01)
*G06T 11/00* (2006.01)

(52) U.S. Cl.
CPC ............... *G06F 3/012* (2013.01); *G06F 3/14* (2013.01); *G06T 11/00* (2013.01); *G06T 2200/24* (2013.01)

(58) Field of Classification Search
CPC .. G06F 21/32; G06F 21/44; G06F 2221/2149; G06V 40/197; G06V 40/18; G06T 7/20; G06T 7/70; G06T 2207/10016; G06T 2207/10024; G06T 2207/20084
See application file for complete search history.

(56) References Cited

U.S. PATENT DOCUMENTS

| 10,181,219 B1 | 1/2019 | Murphy et al. |
| 10,754,496 B2 | 8/2020 | Kiemele et al. |
| 11,546,457 B2 | 1/2023 | Sansanwal et al. |
| 2023/0168786 A1* | 6/2023 | Mantri .................. H04L 63/083 715/740 |
| 2024/0103686 A1* | 3/2024 | Pazmino ............... G06T 19/006 |
| 2024/0265079 A1* | 8/2024 | Chu ....................... G06F 21/44 |
| 2024/0311460 A1* | 9/2024 | Salter ....................... G06T 7/20 |

OTHER PUBLICATIONS

Apple Vision Pro User Guide, "Learn basic gestures and controls on Apple Vision Pro", available online at: <https://support.apple.com/en-in/guide/apple-vision-pro/tan1e2a29e00/visionos>, 7 pages.
Apple Vision Pro User Guide, "Type with the virtual keyboard on Apple Vision Pro", available online at: <https://support.apple.com/en-in/guide/apple-vision-pro/tana14220eef/visionos>, 5 pages.
Wikipedia, "Face ID", available online at: <https://en.wikipedia.org/wiki/Face_ID#~:text=The%20Face%20ID%20hardware%20consists,the%20user%2C%20reads%20the%20resulting>, 9 pages.

* cited by examiner

*Primary Examiner* — Nelson M Rosario
(74) *Attorney, Agent, or Firm* — HALEY GUILIANO LLP

(57) ABSTRACT

An extended reality (XR) head-mounted device (HMD) is disclosed. The XR HMD comprises input/output (I/O) circuitry and control circuitry, where the control circuitry is configured to provide an application to a user wearing the XR HMD, connect the XR HMD to at least one mobile device associated with the user based on input capabilities of the mobile device, and wherein the I/O circuitry is configured to establish a connection between the mobile device and the XR HMD and wherein the control circuitry is further configured to cause the mobile device to be unlocked, receive an indication of input from the mobile device, and based on the received indication of input, perform an action in relation to the application being provided via the XR HMD.

20 Claims, 24 Drawing Sheets

SYSTEMS AND METHODS FOR PROVIDING ENHANCED EXTENDED REALITY INTERACTIONS USING PERSONAL ELECTRONIC DEVICES AS INPUT MECHANISMS

BACKGROUND

The present disclosure is related to systems and techniques for optimizing integration of secondary devices into an extended reality (XR) system.

SUMMARY

XR devices often implement techniques to bridge the gap between a virtual experience and the real world. In one approach, XR devices receive direct user inputs, including eye tracking, to determine where a user is looking within a virtual environment alongside hand tracking and gesture recognition or voice commands for executing selection tasks or inputting data. However, in at least some circumstances, the reliance on direct physical or vocal interactions with the XR device can lead to issues such as user fatigue, decreased privacy, and could potentially hinder the broader adoption of XR technology in environments where discreet or hands-free interaction is preferable. For example, continuously using hand gestures or speaking commands in confined spaces, like airplane cabins, or requiring use of a virtual keyboard (floating in front of the user in the XR environment) in situations requiring extensive input, such as typing on the virtual keyboard to compose a document, can be impractical (e.g., fatigue the user over time), cumbersome, and obtrusive.

In another approach, personal electronic devices are integrated as input mechanisms for XR environments. The integration of a secondary device with an XR device raises issues regarding security and usability, however. For example, many smartphones revert to a locked state after being unlocked for a certain duration of time during which no inputs are received, and in one approach, a user who is using a secondary device to provide inputs to a head-mounted display (HMD) may need to continuously exit the XR environment in order to unlock the secondary device, as the secondary device may only be used as an input mechanism to the XR device if the secondary device is in an unlocked state. This approach can create a disjointed user experience and waste valuable time. For example, a user may be required to turn away from the XR device every few minutes to enter a PIN that unlocks the smartphone, which is not only inconvenient for the user, but may waste battery life and/or other computing or network resources of the XR device, which may be sitting idle when the user constantly exits the XR environment to unlock the smartphone. In such an approach, a user may also need to remove an HMD to more clearly see the secondary device during these interactions. The additional steps limit the immersive experience the XR device is intended to create and can deter users from taking advantage of multi-device features.

One solution to this problem is to allow the XR device continual access to the secondary device. For example, in one approach, the secondary device remains unlocked throughout the time period during which the secondary device is being used as an input mechanism for the XR device. This approach may risk exposing sensitive personal information, however. For example, if a display of a secondary device remains on for an extended period of time, a personal notification might be visible to an unintended bypassing party, or another nearby user may access data on the secondary device, unbeknownst to the user who is immersed in the XR device. This risk is amplified by the fact that the device's owner may be immersed in another experience when the notification displays and therefore unable to shield the notification, or other information, from unwanted attention.

The approaches discussed above limit the usability of an extended reality system as the user experience becomes fragmented and, in the case of an unattended display, potentially unsafe. As a result, users may be hesitant to adopt extended reality systems or only use them for limited purposes or in limited settings.

Accordingly, to overcome such problems, systems and methods are disclosed herein for improving secondary device integration into extended reality systems. The systems and methods include techniques for enabling inputs received at an XR device, coupled to a mobile device, to be used to unlock the mobile device, without requiring a user to disengage from the XR experience to unlock the mobile device, and without sacrificing the user's data privacy on the mobile device while using the XR device (e.g., an XR HMD), and to enable battery life and other resources of the XR device to be efficiently utilized when a mobile device is being used to provide inputs to the XR device. For example, in some embodiments, the disclosed systems and methods capture biometric data of a user and present the data to the secondary device to unlock the device without additional user involvement (e.g., based on using facial recognition techniques). In some embodiments, the systems and methods may unlock the device automatically only when it detects a user interaction is required. In some instances, the systems and methods may communicate with the secondary device to run in a low power setting in which needed functions (e.g., use of the keyboard) of the secondary device are unlocked but the display of the secondary device, or a portion thereof, remains off, maintaining privacy and security on the device. In some instances, the low power setting may limit which applications or functions on the secondary device are available to reduce power consumption and/or protect the user's privacy. In one approach, the systems and methods create a virtual display of the secondary device on the display of the HMD that enables a user to interact with the secondary device without removing the HMD. In some embodiments, the virtual display may be tethered or anchored to a representation of the secondary device to enable traditional input techniques, such as typing on a smartphone keyboard, and create a comfortable and realistic experience.

The systems and methods may include an extended reality (XR) HMD, comprising input/output (I/O) circuitry and control circuitry configured to provide an application to a user wearing the XR HMD, connect to the XR HMD, a mobile device of the user, based on input capabilities of the mobile device, wherein the I/O circuitry is configured to establish a connection between the mobile device and the XR HMD, and wherein the control circuitry is further configured to cause the mobile device to be unlocked, receive an indication of input from the mobile device, and based on the received indication of input, perform an action in relation to the application being provided via the XR HMD. In some embodiments, the control circuitry is further configured to cause the mobile device to enter a low power mode wherein a display of the mobile device, or portion thereof, is powered off when the mobile device is in a low power mode and the input from the mobile device is input while the mobile device is in the low power mode. That is, the mobile device may still register user input in low power mode. In some embodiments, the control circuitry is further configured to output a user interface from the mobile device on the XR HMD as an overlay. In some embodiments, causing the mobile device to be unlocked comprises identifying facial features of the user based on biometric data of the user captured by a sensor of the XR HMD, and the mobile device authenticates the user based on the captured data. In some embodiments, the control circuitry is further configured to detect an opportunity for input in the application provided via the XR HMD, enable input on the mobile device for a limited time following the detecting of the opportunity for input, and the receiving the indication of input from the mobile device is during the limited time. In some embodiments, enabling input on the mobile device comprises enabling only input of a specific input type on the mobile device during the limited time. In some embodiments, the control circuitry is further configured to detect visual anchors on the mobile device and provide an overlay anchored to the mobile device using the detected visual anchors. In some embodiments, the control circuitry is further configured to detect on the mobile device an incompatibility with the XR HMD based on outdated data (e.g., missing software patch or update) and, based on the detecting of the incompatibility, cause the outdated data of the mobile device to be updated. In some embodiments, the control circuitry is further configured to detect a context of the application provided via the XR headset, and based on the context, modify the mobile device to receive input corresponding to the context. In some embodiments, the control circuitry is further configured to cause the mobile device to be locked based at least in part on receiving an indication of input from the mobile device. In some embodiments, the control circuitry is further configured to determine a distance between the mobile device and the XR HMD, determine that the distance exceeds a threshold, and, based at least in part on the determining that the distance exceeds the threshold, display on a display of the XR HMD a notification. In some embodiments, the control circuitry is further configured to determine a distance between the mobile device and the XR HMD, based at least in part on the distance, select an input field displayed on the XR HMD, and perform the action in relation to the application by causing the input received from the mobile device to be input into the selected input field.

DETAILED DESCRIPTION

The present disclosure is directed to a system and method for facilitating input in an XR environment by connecting a secondary device and receiving input through the secondary device.

Figure 1:
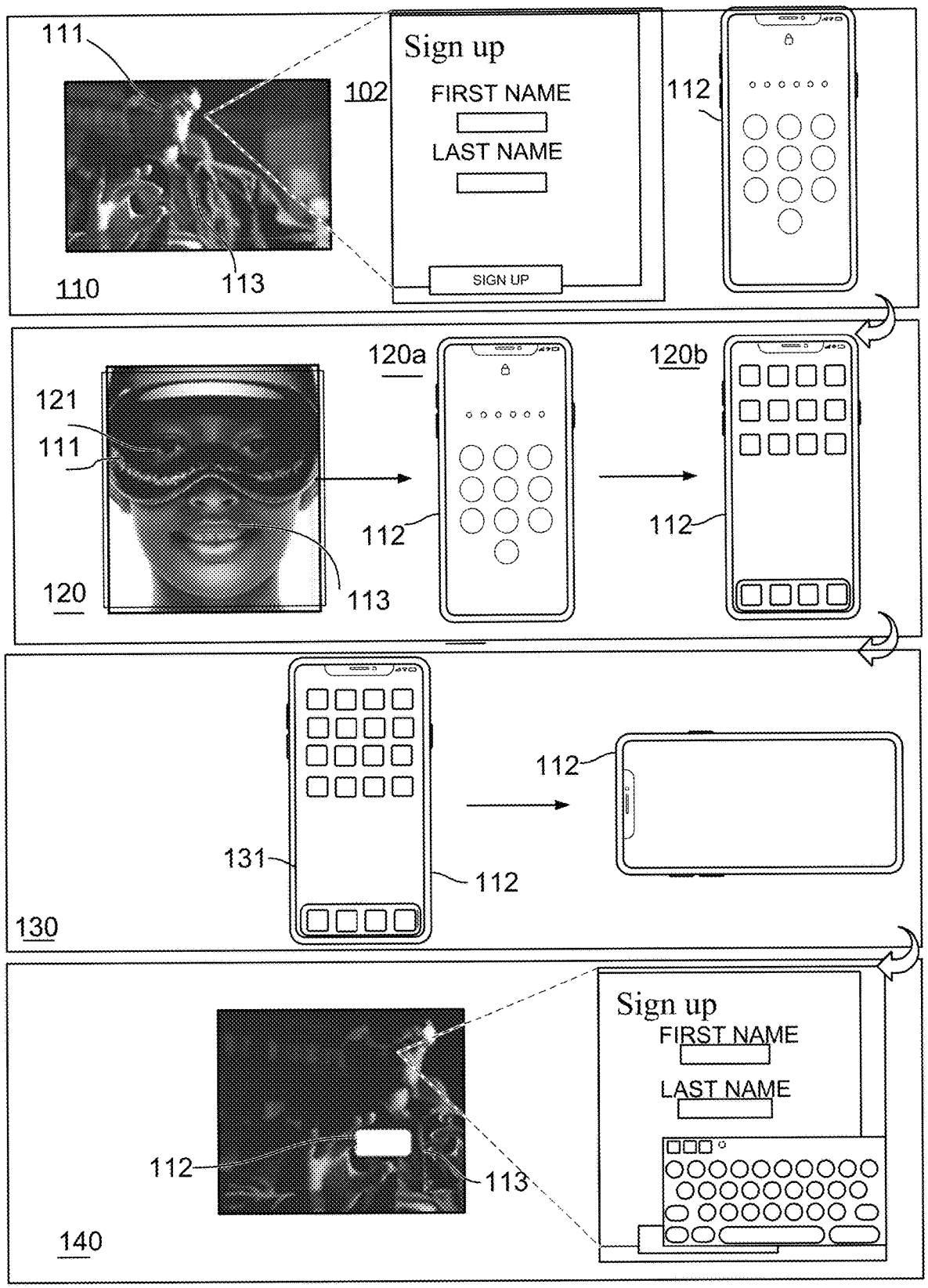
FIG. 1 shows an overview of illustrative techniques performed by an XR system, in accordance with some embodiments of the present disclosure.

FIG. 1 shows an overview of illustrative techniques performed by an XR system in an XR environment, in accordance with some embodiments of the present disclosure. XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

As shown in FIG. 1, at timepoint 110, a user 113 is wearing an XR headset 111. As shown in FIG. 1, XR headset 111 may be an XR head-mounted display (HMD). In some embodiments, XR headset 111 may comprise or correspond to an XR headset; a mobile device such as, for example, a smartphone or tablet; a laptop computer; a personal computer; a desktop computer; a smart television; or wearable device; smart glasses; a stereoscopic display; a wearable camera; XR glasses; XR goggles; a near-eye display device; or any other suitable user equipment, XR device, and/or computing device; or any combination thereof. XR headset 111 may provide for display XR environment 102 to user 113. In a non-limiting example, XR environment 102 may include a sign up page linked with a service, e.g., accessed via a website or application. XR headset 111 may include an input interface, such as a handheld motion sensor, and input sensors (e.g., configured to detect a gaze of a user, voice commands of the user, and/or any other suitable inputs). At timepoint 110, a mobile device 112 of user 113, which may be in the vicinity of XR headset 111, may be locked. Mobile device 112 may be, for example, a smartphone or a tablet, or any other suitable device, or any combination thereof.

In some embodiments, the XR system may comprise or correspond to an XR application, which may be executed at least in part on computing device 111 and/or at one or more remote servers (e.g., a server on cloud network 240 of FIG. 2) and/or at or distributed across any of one or more other suitable computing devices, in communication over any suitable number and/or types of networks (e.g., the Internet). The XR application may be configured to perform the functionalities (or any suitable portion of the functionalities) described herein. In some embodiments, the XR application and/or the system may be a stand-alone application, or may be incorporated as part of any suitable application or system. The XR system may comprise or employ any suitable number of displays, sensors or devices such as those described in FIGS. 1-17, or any other suitable software and/or hardware components; or any combination thereof.

At timepoint 120, the XR system recognizes that the smartphone 112 is available but locked. The XR system may detect the presence of nearby devices, such as smartphones, smartwatches, and smart rings, through a combination of wireless communication protocols, proximity-sensing technologies, and secure detection methods. These methods and protocols such as Bluetooth Low Energy (BLE), Wi-Fi Direct, and Near Field Communication (NFC) play a key role in enabling the communication between personal electronic devices. For instance, BLE is commonly used for continuous connection between devices like smartphones and smartwatches, allowing for immediate detection and communication without significantly draining the battery of either device. Additionally, proximity sensors, often integrated into personal electronic devices, can detect the presence of nearby objects without any physical contact. For example, using its proximity sensors, a mobile phone can determine if it is in a user's pocket and a watch can determine it is on a user's wrist.

Once the XR system detects the smartphone 112, it determines the capabilities of the smartphone 112 to gather compatibility with the XR system 200 and input mechanisms. For example, the XR system 200 determines that the mobile device 112 includes a touchscreen with a keyboard option. Entering text through the mobile device 112 keyboard is often faster and simpler than doing so through the XR headset 111 as a user can efficiently enter text though the keyboard. The XR system connects with the smartphone 112 via Wi-Fi, Bluetooth, or other connection means, and receives a selection from the user 113 to enter input through smartphone 112. In some embodiments, the XR system detects multiple devices and determines their capabilities. For example, the XR system may detect a smartphone and a smartwatch upon encountering an email application requiring long form textual input. The smartwatch does not have a keyboard function, while the smartphone does have a keyboard function. The XR system 200 then selects the smartphone as the secondary device based on its keyboard capability.

The XR system may cause mobile device 112 to be unlocked for use. While this step would typically require that user 113 remove XR headset 111 to see smartphone 112, the XR system instead unlocks mobile device 112 through facial recognition by collecting biometric data of the user 113 at timepoint 120. The XR system 200 communicates data based on the data of the user 113 to the mobile device 112 at timepoint 120a. For example, the XR system may display at timepoint 120a a code or image on a front-facing display 121 of the XR headset 111 that communicates facial vectors of user 113 to mobile device 112. Locked mobile device 112 receives the data, for example as a code or image, at timepoint 120b and, based on the information communicated through the code or image, XR headset 111 causes mobile device 112 to be unlocked.

In some embodiments, at timepoint 130, the XR system may cause display 131 of smartphone 112 or a portion thereof to be turned off, to protect the privacy of the user by obscuring from view information entered and displayed on display 131. If the display 131 remained visible, sensitive information may be available to onlookers. Because the owner of smartphone 112, the user 113 of XR headset 111, is occupied in an XR environment, he or she may be unaware of onlookers and unable to protect his or her privacy. This modification also saves battery power as electricity is no longer required to power the display 131. It further may deter crime (e.g., another person stealing the user device) as an unlocked smartphone may be a target for a person interested in stealing the smartphone 112, information on the smartphone 112, or an identity linked with the smartphone 112.

At timepoint 140, mobile device 112 is unlocked and connected to the system including XR headset 111. The user 113 is now able to use a virtual keyboard of mobile device 112 (or any other suitable input mechanism of mobile device 112) to enter information into the interface displayed on the XR headset 111. For example, the mobile device 112 receives input from user 113 typing (e.g., at the application providing the sign-up page in XR environment 102) through the keyboard on smartphone 112. In some embodiments, the move to a secondary input mechanism activates a high security which obscures input. For example, the high security mode may include a keyboard in which characters are arranged unconventionally to prevent onlookers from deciphering the input. In some embodiments, the high security mode is active only for certain fields such as usernames, passwords, or other sensitive information. In some embodiments the high security mode is based on or activated by an activity of the XR system. In some embodiments, display 131 of smartphone 112 may be powered off (e.g., in a low power mode), and while mobile device 112 is held in a field of view of user 113 wearing XR headset 111, XR headset 111 may overlay a virtual keyboard on the powered off display 131 of mobile device 112, to enable user 113 to view and provide input via a virtual keyboard or display on the mobile device 112 provided via XR headset 111, enabling the user 113 to see and use mobile device 112 while in the XR environment. In some embodiments, XR headset 111 may overlay a virtual keyboard while the display 131 is on or partially on. For example, display 131 may display low brightness or low density information. In some embodiments, the XR headset 111 uses this low brightness or low density information to anchor the virtual keyboard to the display 131. In some embodiments, the XR system 200 ensures that XR headset 111 provides the overlay of the virtual keyboard to user 113 in the correct position by using visual signals of the mobile device 112 (e.g., captured images of mobile device 112) to anchor the virtual keyboard to display 131. In some embodiments, the XR system anchors the keyboard on top of a virtual representation of the smartphone 112 such that, when the user 113 is looking at a virtual representation of the smartphone 112, the virtual keyboard appears to be the display of the smartphone 131. For example, if smartphone 112 is in the hands of a user 113 while user 113 wears XR headset 111, the user 113 may look in the direction of his or her hands through the display of the XR headset 111 and see the smartphone 112 displaying a keyboard, while in reality outside of the XR environment, the display of the smartphone 131 is off or displays an output other than the keyboard. In some embodiments, mobile device 112 functions normally despite the display being off, partially off, or otherwise in a low power mode, meaning that mobile device 112 may receive keyboard input at timepoint 140. In such a scenario, mobile device 112 may transfer data indicating the received input to the XR system for use in the XR environment 102.

Figure 2:
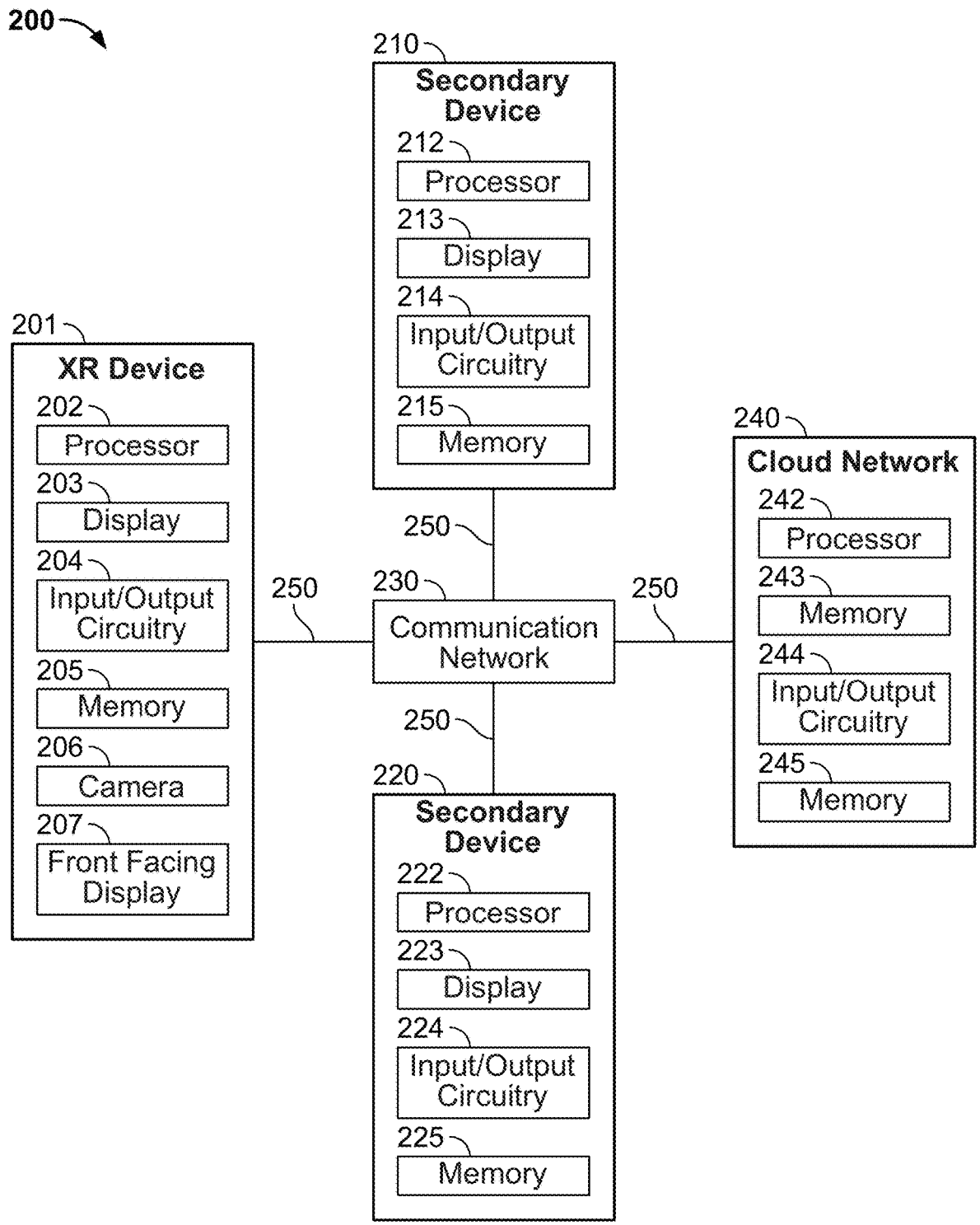
FIG. 2 shows an example architecture of the system of FIG. 1, in accordance with some embodiments of the present disclosure.

FIG. 2 shows an example architecture of XR system 200 of the system of FIG. 1, in accordance with some embodiments of this disclosure. The system may include an XR device 201 which may correspond to XR headset 111. XR device 201 may also be a virtual reality headset or other immersive digital device. XR device 201 includes a processor 202, display 203, input/output circuitry 204 and memory 205.

Processor 202 may be based on any suitable processing circuitry and includes control circuitry and memory circuitry, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processor 202 may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuitry may be implemented in hardware, firmware, or software. Processor 202 may include communication circuitry, storage and processing circuitry. Processor 202 may be utilized to execute or perform any or all the systems, methods, processes, and outputs of one or more of FIGS. 1-17, or any combination of steps thereof.

In some embodiments, processor 202 executes instructions for an application stored in memory 205. Specifically, processor 202 may be instructed by an application to perform the functions discussed herein. In some embodiments, any action performed by processor 202 may be based on instructions received from the application. For example, the application may be implemented as software or a set of and/or one or more executable instructions that may be stored in storage and executed by processor 202. The application may be a client/server application where only a server application resides on a server.

The display 203 of the XR device 201 in some embodiments includes internal screens that surround the eyes of the user. In some embodiments, the display 203 covers all viewing angles of the user such that the user sees only the display 203. In this way, the display 203 creates a feeling that the user is fully submerged in the virtual environment. In some embodiments, the XR device 201 also includes a front facing display, or front facing display, 207 on the external of the XR device 201 that is visible to devices and individuals not using the XR device 201. In some embodiments, the XR device 201 further includes sensors 206 capable of capturing biometrical data of the user while the user (e.g., user 113 of FIG. 1) is wearing the XR device 201.

XR device 201 may be connected via connections 250 (e.g., a wired or wireless connection) to one or more secondary devices 210 and 220. Devices 201, 210, and 220 may be coupled to communication network 230. Communication network 230 may be one or more networks including the Internet, a mobile phone network, mobile voice or data network (e.g., a 5G, 4G, or LTE network), cable network, public switched telephone network, or other types of communication network or combinations of communication networks. Paths 250 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the devices may be provided by one or more of these communications paths but are shown as a single path to avoid overcomplicating the drawing. Although communications paths are not drawn between computing devices, the devices 201, 210, and 220 may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The devices 201, 210, and 220 may also communicate with each other directly through an indirect path via communication network 230.

Secondary devices 210 and 220 may be any devices capable of a connection with an XR headset. For example, secondary devices 210 and 220 may be any one or combination of a smartphone, a smartwatch, a PC, a second XR device or any other device that might be integrated into an XR environment. Each of secondary devices 210 and 220 may be connected to the XR device 201 through connection 250, which may be any means known, such as, for example, WiFi, Bluetooth, or other connection mechanism. Each of secondary devices 210 and 220 includes a processor 212, 222 respectively, display 213, 223 respectively, input/output circuitry 214, 224 respectively and memory 215, 225 respectively. Processors 212 and 222 may be similar in function and build to processor 202. The architecture further comprises cloud network 240, which is also connected to XR device 201, secondary device 210 and secondary device 220 via connections 250. Cloud network 240 includes a processor 242, display 243, input/output circuitry 244 and memory 245. Cloud network 240 may comprise any suitable number of servers and databases, on which processing and storage may be distributed, to provide the XR system 200 described herein.

The XR system 200 may be implemented using any suitable architecture. For example, it may be a stand-alone application wholly implemented on each one of devices 201, 210, and 220. In such an approach, instructions of the application may be stored locally (e.g., in memory 205), and data for use by the application is downloaded on a periodic basis (e.g., from an out-of-band feed, from an Internet resource, or using another suitable approach). Control circuitry, i.e., any of processors 202, 212, 222, or 242, may retrieve instructions of the application from storage and process the instructions to provide the functionality, and generate any of the displays, discussed herein. Based on the processed instructions, control circuitry may determine what action to perform when input is received from a user input interface. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, random access memory (RAM), etc.

Figure 3A:
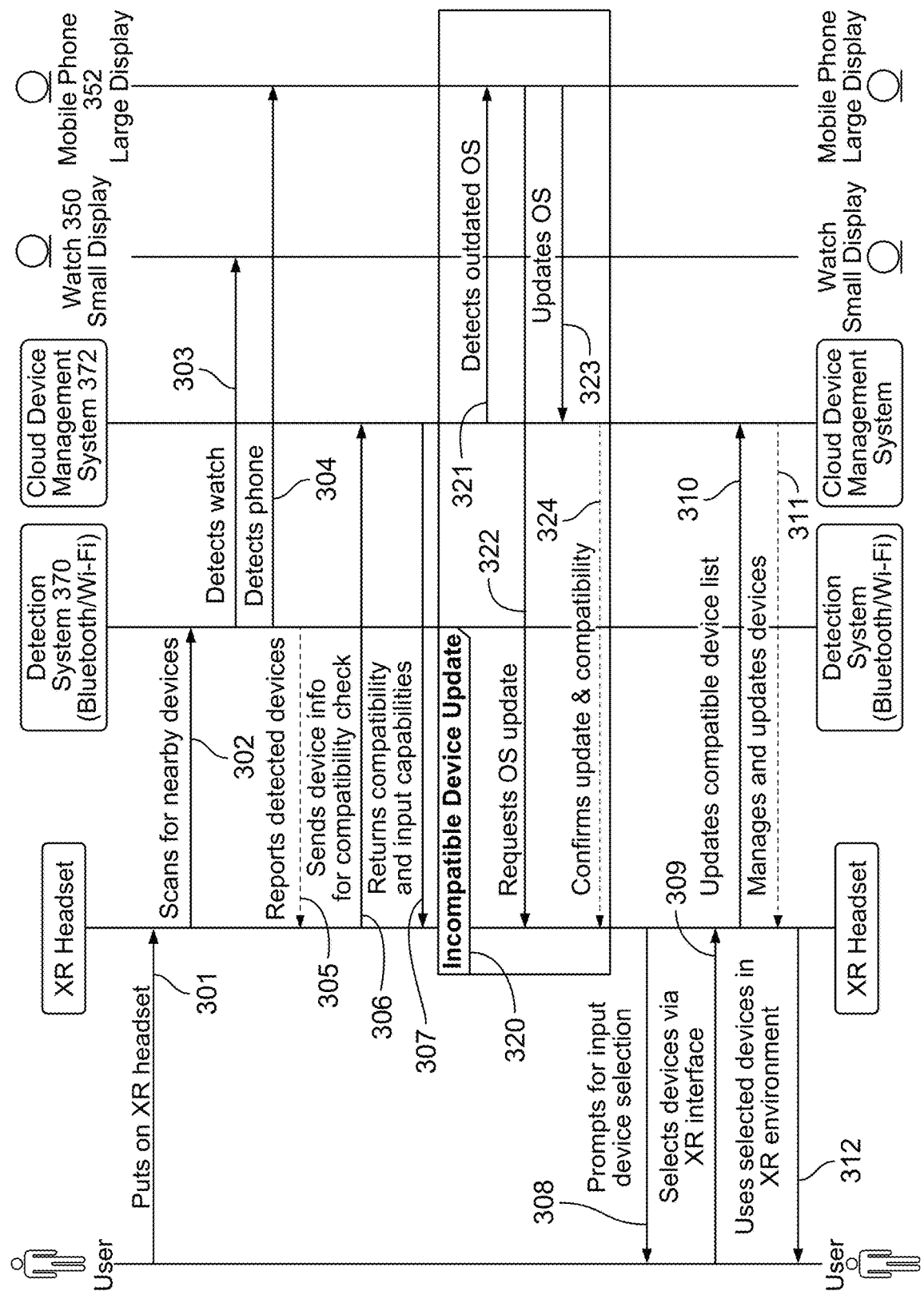
FIG. 3A shows an example process of the XR system, in accordance with some embodiments of the present disclosure.

FIG. 3A shows a sequence diagram for the XR system 200, in accordance with some embodiments of this disclosure. At step 301, an XR device 201, such as XR device 201, initiates. The XR system 200 at step 302 scans for nearby secondary devices, such as secondary devices 210 and 220, via a detection system 370, which may be included as part of the XR system described herein. The detection system 370 may detect nearby secondary devices using any suitable technique, such as, for example, Bluetooth, WiFi, or a combination of methods. In the illustrated embodiment of FIG. 3A, the detection system detects watch 350 and mobile phone 352 at steps 303 and 304 respectively. The detection system 370 reports the detected devices to the system 200 at step 305. In one embodiment, devices 350 and 352 are already registered with the XR device and are automatically paired with the XR device (i.e., the devices can communicate with each other, via Bluetooth, LAN, Internet/WAN, etc.).

At step 306, the XR device 201, via XR system 200, sends data regarding the detected secondary devices 350, 352 to a cloud device management system 372, such as cloud system 240, to determine if the devices 350, 352 are compatible with the system. The cloud device management system 372 in response returns capability determinations and information regarding input capabilities of the devices 350, 352 to the XR system 200 on the XR device 201 at step 307. In an example, the system may determine at step 307 that watch 350 has a small touchscreen display or mobile phone 352 has a large touchscreen display. At this step, the system 200 may also determine the compatibility of software, such as firmware, an operating system, or a companion application, installed or running on the devices 350, 352 and determine what types of inputs are supported by each device. In cases where detected devices 350, 352 are found to be initially incompatible due to outdated firmware or operating system versions, the system 200 offers a mechanism for automatically triggering an update to these devices 350, 352, or applications involved to enhance compatibility with the system 200. In the event that a device is not compatible, the system 200 moves to 320 of the sequence to initiate an incompatible device update. For example, at 321, the XR system detects an outdated operating system on mobile phone 352. Mobile phone 352 then requests an operating system update at 322. Mobile phone 352 updates the operating system at 323 and the cloud device management system 372 confirms the update and compatibility at 324. In some embodiments, updating software of a device may include downloading a companion application or plugin for a browser or application.

Figure 3B:
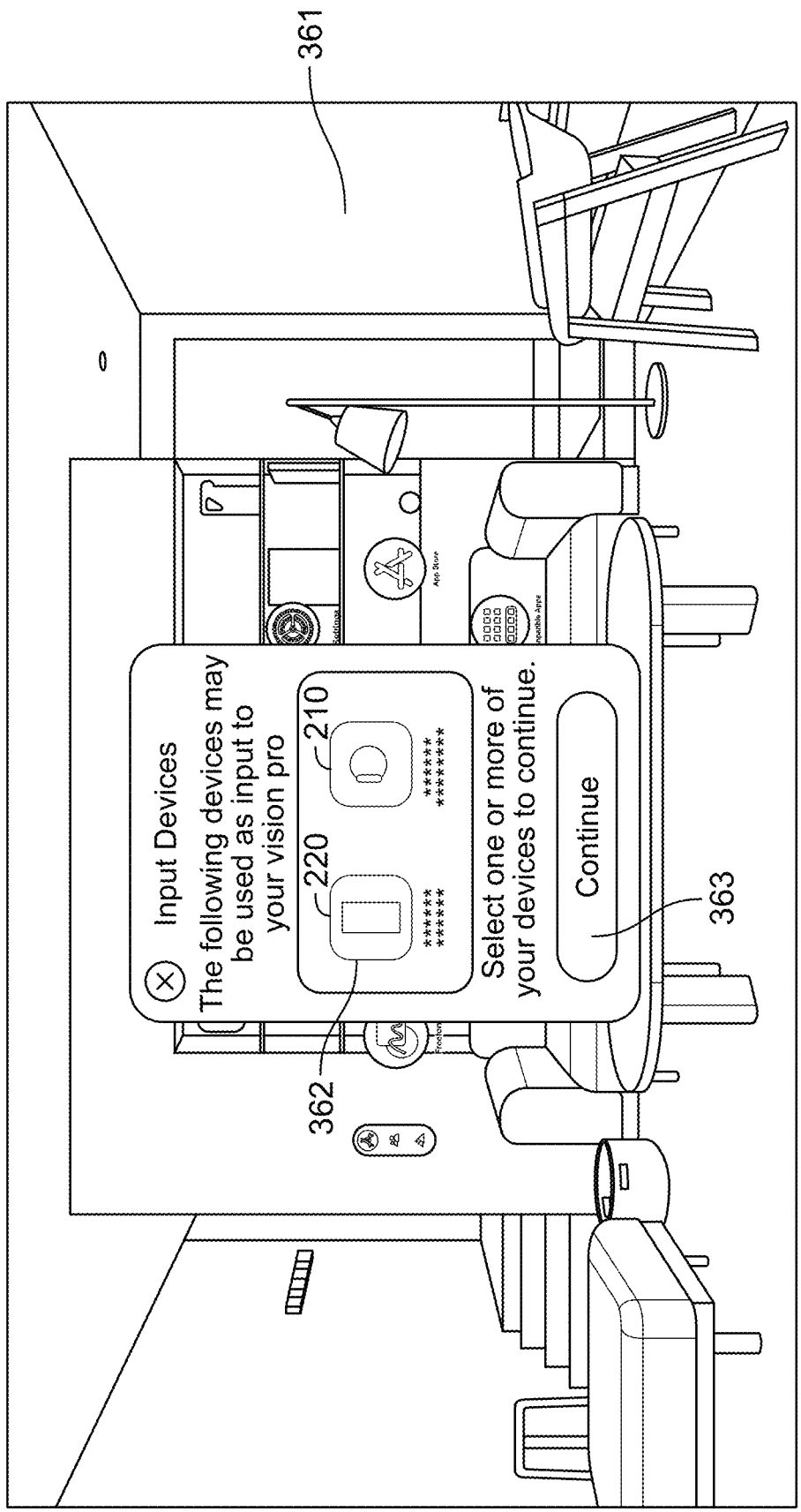
FIG. 3B shows an example XR device display presenting secondary device selection options for a smartphone and smartwatch, in accordance with some embodiments of the present disclosure.

The XR system 200 may utilize the cloud device management system 372 not only for this initial compatibility check but also to continuously manage and update a list of compatible secondary devices and their respective input capabilities. This may additionally allow the dynamic installation of applications on compatible secondary devices 210 based on user selection from within the XR device environment. Once the system 200 confirms a secondary device 210, such as mobile phone 352, is compatible, it prompts a user for input regarding a secondary device selection at 308, receiving the selection at 309 via an XR interface. FIG. 3B shows an example XR device display 361 presenting secondary device selection options for smartphone 220 and smartwatch 210, respectively. The XR system 200 may then receive a selection of a device from list 362 and select the "continue" button 363 to indicate a selection has been made. This prompting may comprise a user selection within the XR device 201, or in a more advanced way, for example, detecting the secondary device 210 through a visual camera system of XR device 201 itself. At 310, the XR system updates the compatible secondary device list and at 311 manages and updates secondary devices. Finally, at 312 the system uses the selected secondary device in the XR environment.

As discussed above, the XR system 200 may recognize and connect with known secondary devices such as secondary devices 210 and 220 or smartphone 112. In some embodiments, the XR system 200 determines when known or familiar secondary devices are in proximity, using techniques such as, for example, Bluetooth, Wi-Fi, or other protocols for detection of proximity. The XR system 200 may recognize the device in several ways, however, such as through broadcasting a message that includes a one-time or multi-session token to all devices. This token may be displayed on the screen of the device if the device has a display. The XR system then reads the token to include the device as an input device for the XR session or for use by a particular application.

Another device recognition technique is broadcasting a message to the devices and accepting user inputs, for example an opt-on option, for each device. Another method for device recognition is through user preferences. For example, the XR system 200 may receive a selection of an option to "use this device for inputs when requested by the XR device," and the XR system 200 may recognize the device automatically.

Another device recognition technique is through the use of computer vision and the XR system's 200 ability to recognize the type of device via a capture from the XR device's camera 206. For example, the XR system 200 may detect that a mobile device and a smartwatch are nearby and belong to the user. The mobile device comes into view of the XR device's cameras 206 and the XR system 200 differentiates between the watch and the mobile device and chooses the mobile device as the only input.

In some embodiments, the XR system continually monitors nearby devices including an option to challenge or override a second sign in on the secondary device 210 when the secondary device 210 is connected to the XR system 200. This option may prevent theft or interference from a bad actor as the XR system 200 will detect a secondary, possibly unauthorized, sign in. Similarly, the XR system 200 in some embodiments may produce an alert if the secondary device 210 moves out of a designated range of the XR device 201 or otherwise into an undesired location.

Upon detection, the XR system 200 communicates with a cloud device management system 372, such as cloud system 240, to determine the capabilities of each device. For example, the cloud device management system 372 may distinguish between a smartwatch 350 with a small touchscreen display and mobile phone 352 with a large touchscreen display. The cloud device management system 372 may also determine the compatibility of the firmware or operating system installed or running on the secondary devices and determine what types of inputs each secondary device supports. In some embodiments, an application running on the XR system 200 may provide information regarding inputs and other details the application supports. The XR system 200 may use that information to determine compatibility. In some embodiments, the XR system 200 prompts the user to indicate which secondary devices 210 are desired for use as input devices. This prompting may consist of a user selection within the XR device 201, or in a more advanced way, detecting the device through the visual camera system of the XR device 201 itself.

Figure 4A:
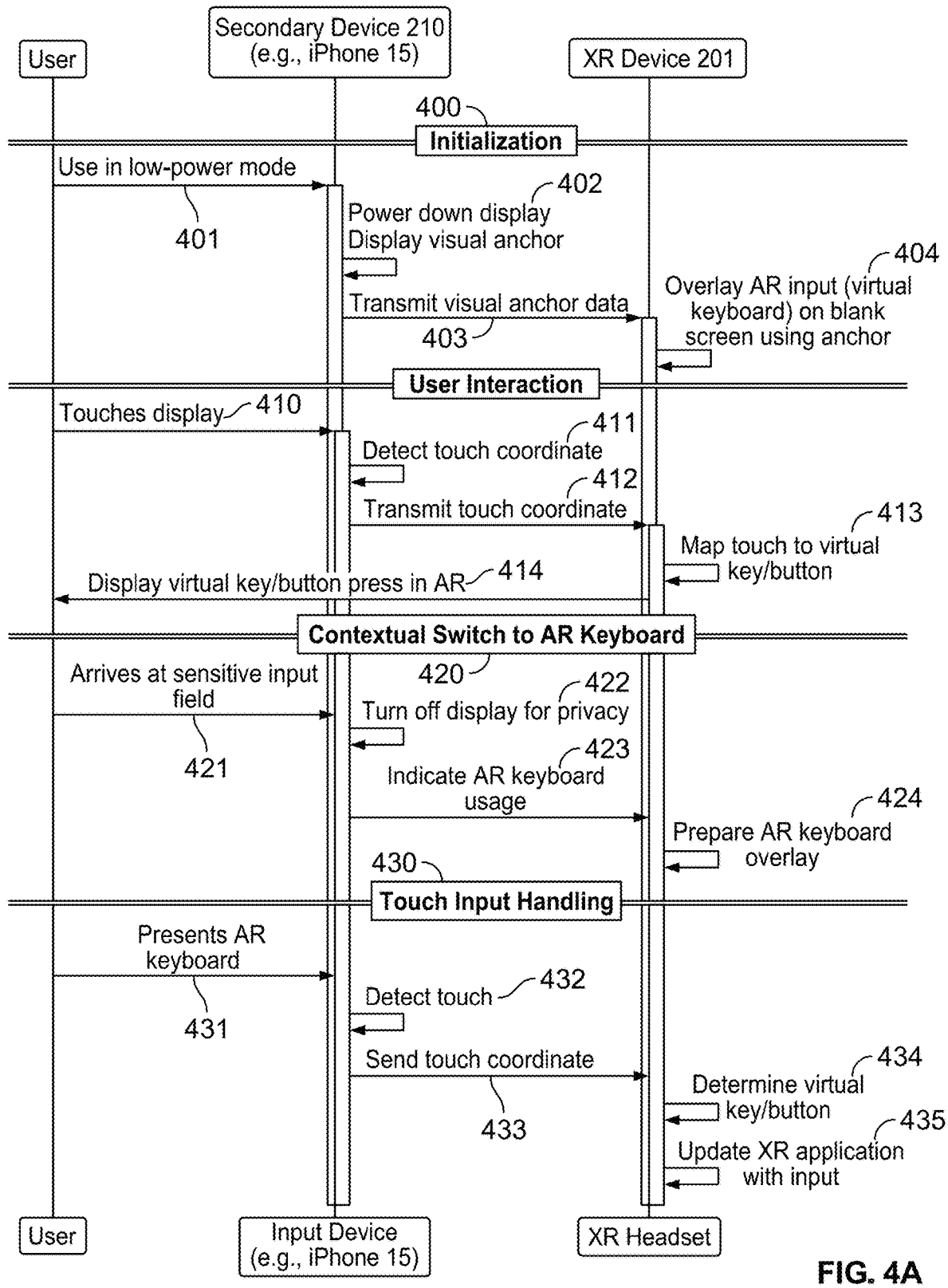
FIG. 4A shows example existing markers of a secondary device, in accordance with some embodiments of the present disclosure.
Figure 4B:
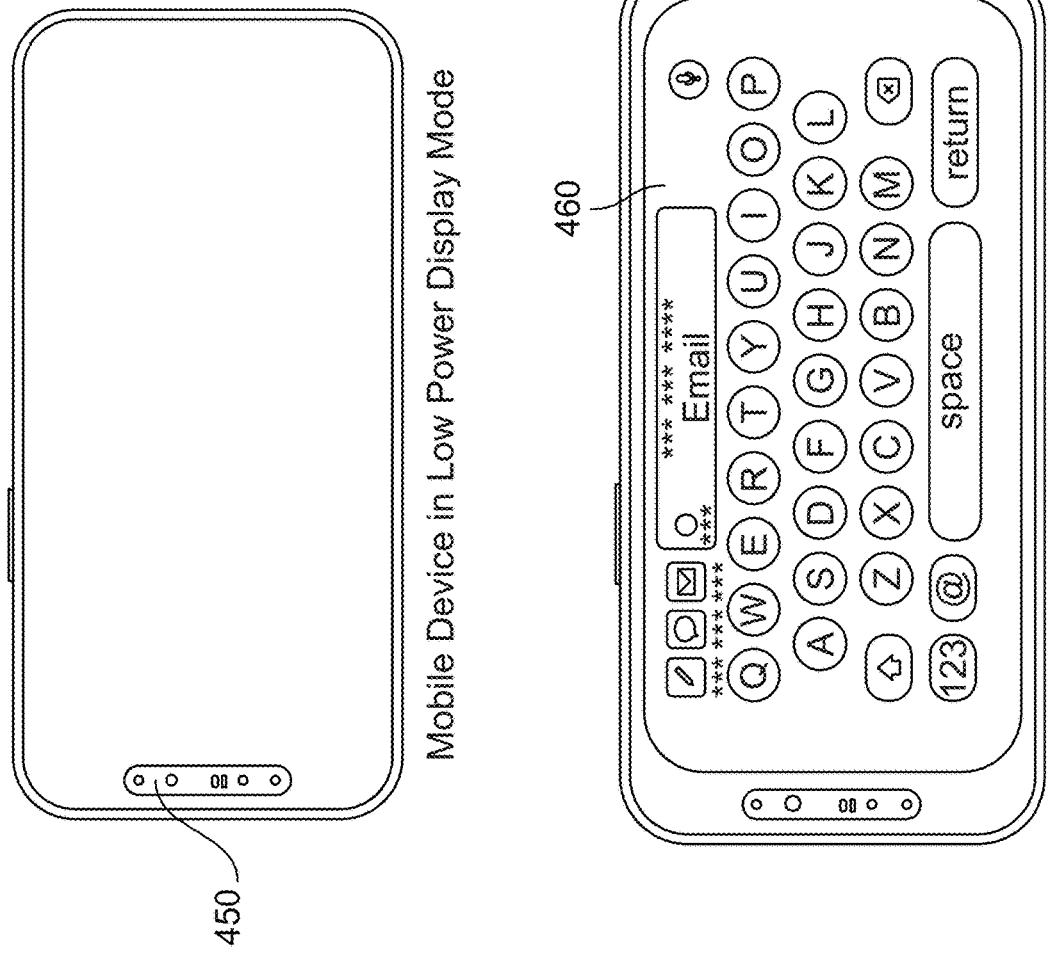
FIG. 4B shows an example method of connecting secondary devices with the XR system, in accordance with some embodiments of the present disclosure.

Once the system has received a selection of a secondary device 210, the secondary device 210 may be used within the XR system 200. FIG. 4A shows an example method of connecting a secondary device 210 into the system. The method begins at step 400, when the XR system 200 initializes the secondary device 210. At step 401 the secondary device 210 runs in low-power mode and, at 402, alters the display of the secondary device 210, which is akin to display 131. In some embodiments, the XR system 200 causes the secondary device 210 to enter a low power mode in which the display of secondary device 210, or a portion thereof, is turned off or dimmed. In some embodiments the low power mode includes an input mode in which the display still displays what it is supposed to display, i.e. a keyboard. The low power mode may be advantageous in some embodiments, due to the fact that many XR devices 201 are immersive, meaning they limit stimuli from the real world reaching the user. For example, many XR device 201 displays cover a user's eyes and view such that the user is unable or mostly unable to see the real world when wearing the XR device. Many XR devices include headphones as well that block or mostly block sound from the real world. Due to this situation, a user may not be able to view the display of the secondary device 210. The user further may not be able to detect bad actors interacting with the secondary device 210. Turning off or dimming the display of the secondary device 210 or a portion thereof both saves battery power by preventing unnecessary power usage and deters bad actors as, without a glowing display, the secondary device 210 may be hidden or call less attention to itself. Next at 403, the secondary device 210 displays on its display a visual anchor, such as a shape of known dimensions. In some embodiments in which the low power mode dims the display 131, the visual anchor may also be dimmed or may be displayed brighter than the remainder of the display 131. In some embodiments in which the low power mode turns off the display 131, a portion of the display may be restored to show the visual anchor. In some embodiments, existing markers 450 of secondary device 210 may be used as a visual anchor in place of a displayed visual anchor. An example of existing markers 450 are shown in FIG. 4B where the XR system 200 may use known characteristics of the secondary device 210, here visible physical components of the secondary device 210, including for example, the black bar known colloquially as the "black island," as an anchor. The XR device 201, and by extension XR system 200, receives the anchor data and, at 404, the KR system 200 causes display of an AR overlay or AR input, such as a virtual keyboard 460, on a blank screen of the secondary device 210 based on information the visual anchor provides. In some embodiments, as the visual anchor changes position, the AR overlay or input changes position on the display of the XR device 201 to remain aligned with the secondary device 210.

At step 410, the KR system 200 receives input from a user. For example, the KR system 100 may receive input in the form of a touch on the touchscreen display of secondary device 210. The secondary device 210 then, at 411, detects the touch coordinates it has received. At 412, the secondary device 210 via the XR system 200 transmits the coordinates to the XR device 201 and, at step 413, the XR system 200 maps the touch coordinates to a virtual key or button on the display of XR device 201. The XR system 200 then causes, at step 414, the XR device 201 to display to a user a virtual key or button via the display of XR device 201.

At step 420, the XR system 200 switches input to a virtual keyboard based on context. This approach allows the user to enjoy a more private experience when entering text or other inputs that benefit from increased security. In some embodiments, the switch from an on screen display to this more private mode may be based on the context of the required input. For example, the KR system 200 may display a keyboard on a display of a secondary device 210 until it encounters a password input field. At this point, the display of the secondary device may turn off and instead the system may receive input through the KR device 201. Such a process beings at step 421, where the XR system 200 arrives at a sensitive input field. At step 422, the system turns off the display of the secondary device 210 to maintain user privacy. In some embodiments the move to a secondary input mechanism activates a high security which obscures input. For example, the high security mode may include a keyboard in which characters are arranged unconventionally to prevent onlookers from deciphering the input. In some embodiments, the high security mode is active only for certain fields such as usernames, passwords, or other sensitive information. In some embodiments the high security mode is based on or activated by an activity of the XR system. The system then displays at 423 a message indicating an option for an augmented reality keyboard. At 424, the system prepares the augmented reality keyboard overlay on the display of the XR device 201 after receiving a selection of that option.

At step 430 the XR system 200 receives input through touch on the secondary device 210. At step 431 the XR system 200 presents an augmented reality keyboard seen on the display of the KR headset 111 and overlaid on the view of the secondary device's 210 touchscreen on the display of the XR headset 111. The XR system then receives touch input. The secondary device 210 detects touch input at 432 and, at 433, sends touch coordinates to the XR system 200, in some embodiments, by way of XR headset 111. In some embodiments, the XR system 200 enables a high security mode prior to receiving the input. For example, in some embodiments, in one high security mode the keys of the virtual keyboard may be shuffled to prevent onlookers from detecting what is entered on the keyboard. In some embodiments a high security mode is only active for certain fields, such as usernames and passwords. In some embodiments the high security mode is based on or triggered by an activity. The XR system 200 determines the intended virtual key or button at 434 based on the received touch coordinates and at 435 updates an application on the XR device based on the input.

In some embodiments, once the XR system 200 has detected the secondary device 210 and determined its capabilities, as described above, the secondary device 210 displays an on-display marker of a known shape or size, either in a regular or low-power mode. The XR system 200 may then use this marker to anchor an augmented input overlay, for example a virtual keyboard, on top of a representation of a physical secondary device 210 as seen through the display of the XR device 201. In some embodiments, an overlay may streamline use of the secondary device 210 within the XR system 200 because it eliminates the need to remove XR device 201 to see the display of the secondary device 210. Instead, the XR system 200 generates a virtual display of the secondary device 210 to be displayed on the display of the XR device 201. In this way, the user sees a view of the display of the secondary device 210 in the XR environment. In some embodiments, the overlay is generated to be anchored to the secondary device 210 in real life. For example, if a user is holding the secondary device 210, when the user looks down at his or her hands, he or she will see the virtual overlay in the XR environment in a position that appears to be exactly or near to where the secondary device 210 is held in real life. This creates a continuity between what the user senses in the real world, such as the weight and tactile senses of the secondary device 210, and what the user senses in the XR environment. Using known dimensions of the display of the secondary device 210 as a scale reference, the system can accurately calculate the size of the virtual overlay based on the known size of the marker and the known dimensions of the display. This is useful to overcome issues in environments where depth information may be hard to obtain such as when there is low lighting. This indicator could be a graphical display or a known physical feature of the input device such as the "black island" on an iPhone 15 or even the camera opening on a mobile device which is detectable even when the device is completely turned off. Once the coordinates of the physical secondary device 210 are known, then the coordinates of a virtual or augmented input mechanism, such as a keyboard, are mapped to the secondary device 210 and dynamically updated as the image of the secondary device on the display of the XR device 201 changes. Once received, coordinates of touch input on the secondary device 210 are transmitted to the XR system 200, in some embodiments by way of the XR device 201. The received coordinates are then reconciled with the coordinates of the virtual input mechanism at the time the touch was detected on the secondary device 210, and the XR system 200 maps the touch coordinates to a virtual button, location or virtual input representation. Based on this mapping, the XR system 200 registers the input to the application in use.

Figure 5A:
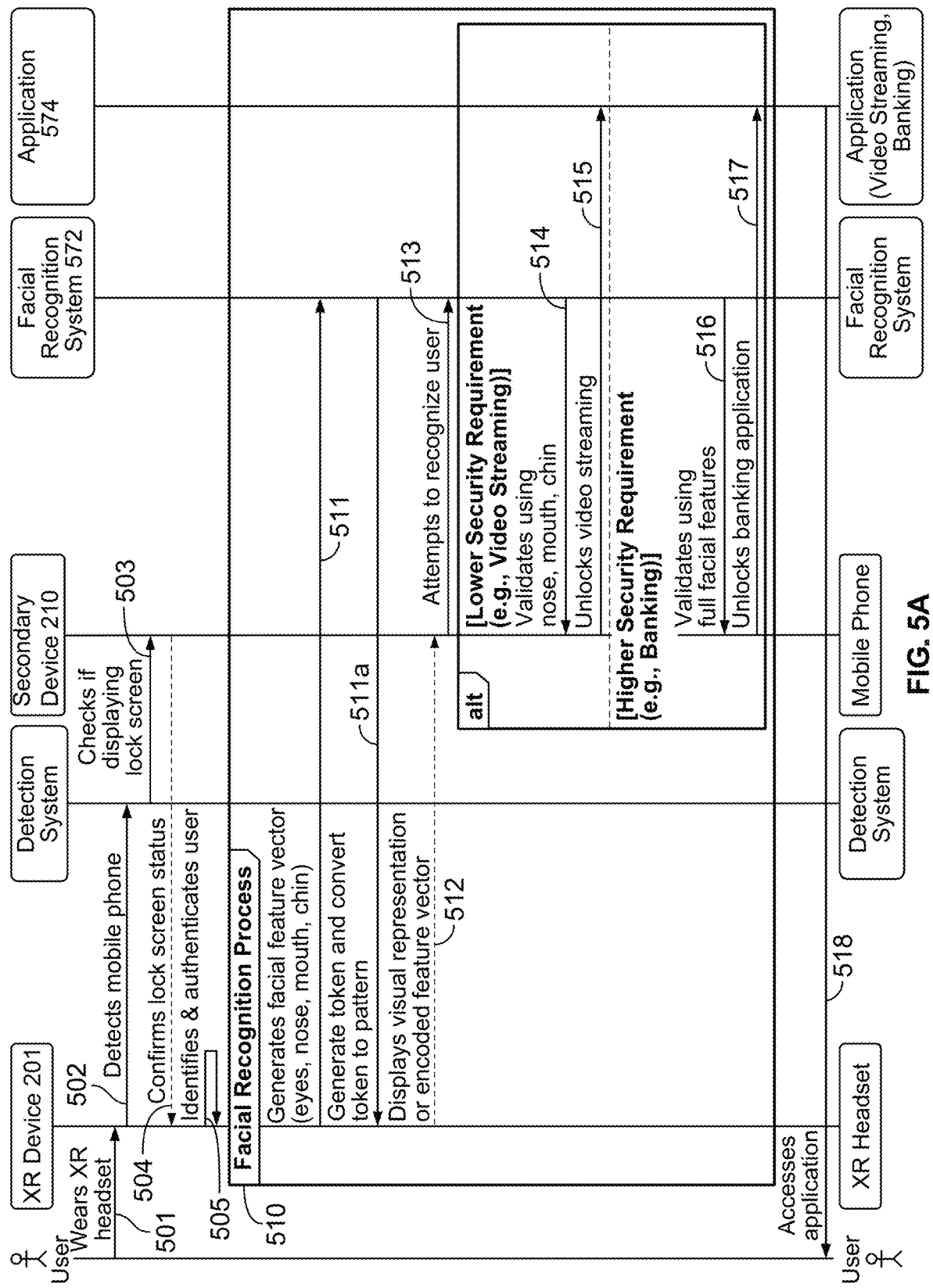
FIG. 5A shows an example process of the system of unlocking a connected secondary device, in accordance with some embodiments of the present disclosure.
Figure 5B:
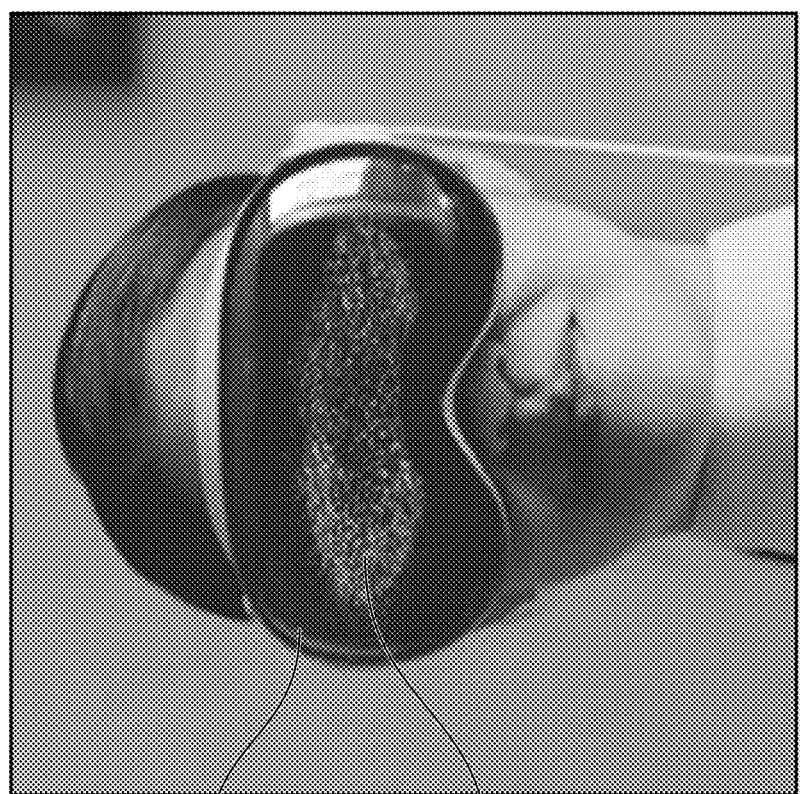
FIG. 5B shows two types of encoding, in accordance with some embodiments of the present disclosure.
Figure 5B:
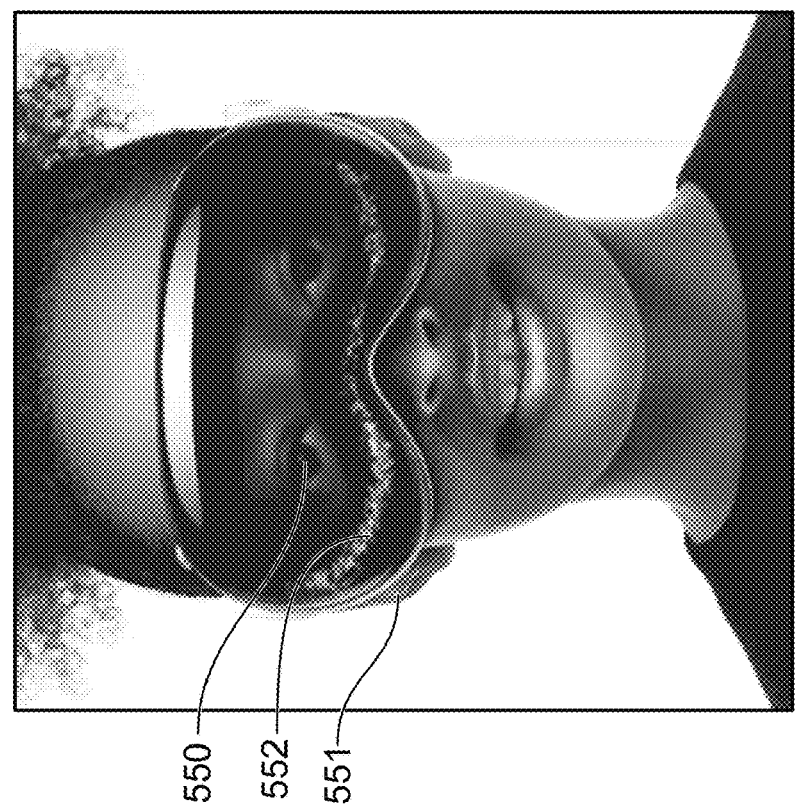
Figure 5C:
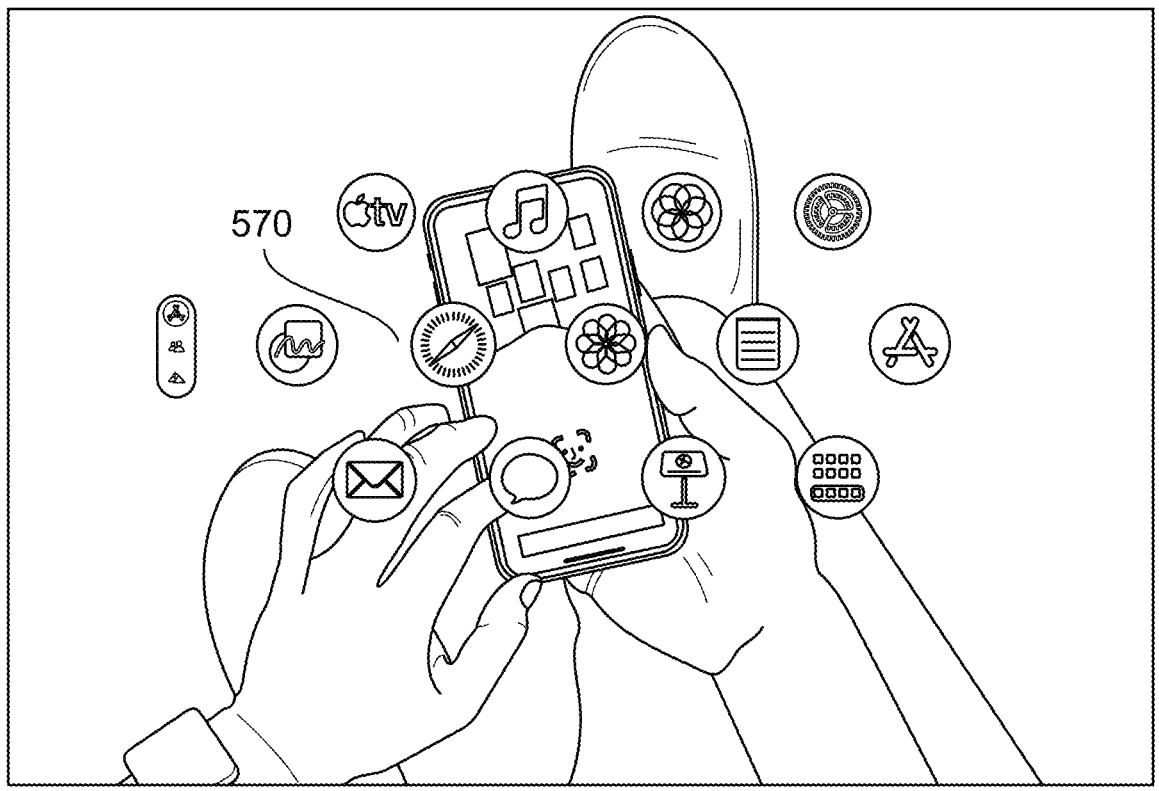
FIG. 5C shows a display of an XR device using an XR environment and encountering a locked secondary device, in accordance with some embodiments of the present disclosure.
Figure 5C:
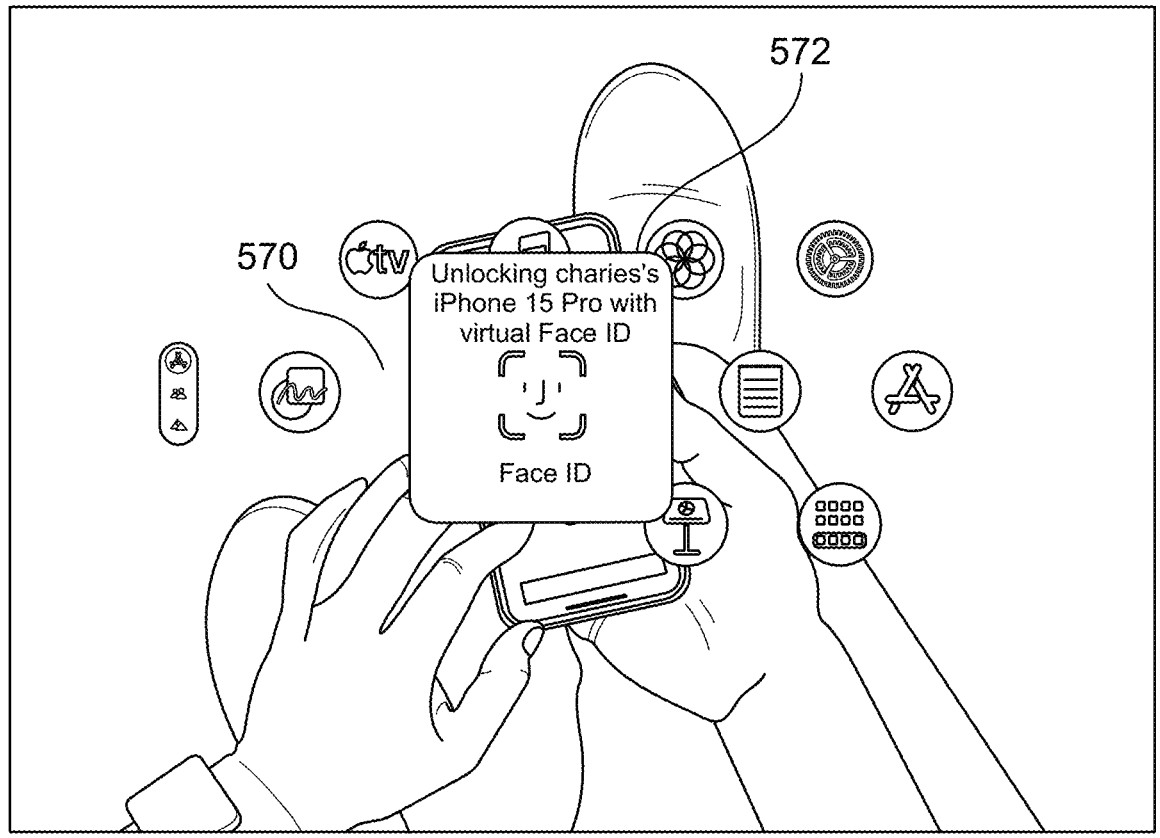

In some embodiments, a selected secondary device 210, for example a secondary device 210 selected at step 309 in the process shown in FIG. 3A, may be locked. FIG. 5A illustrates an example process of the system of unlocking a connected secondary device 210 without interrupting an XR experience. First, at step 501, a user is wearing an XR device 201. The XR device 201, via the XR system 200, detects a secondary device 210, here a mobile phone, at 502. For example, FIG. 5C shows a display of XR device 201 using XR environment 570 and encountering locked secondary device 572. At 503, the detection system 570 of the XR system 200 determines whether the mobile phone is displaying a lock screen, meaning the device is locked, and, at 504, confirms the lock screen status.

The XR system 200 then at the XR device 201 identifies and authenticates the user at 505 to ensure that the XR system 200 is unlocking the device for an authorized user. In some embodiments, the identification and authentication process uses facial recognition, as shown in block 510. In some embodiments, such as that shown in FIG. 5C, the XR system 200 first displays a notification 574 of the authentication process. Then, the XR device 201 collects biometric data of a user using internal sensors. Then the XR system 200 at 511 generates, based on the biometric data, facial features vectors such as those corresponding to the eyes, nose, mouth, or chin of a user and sends the vectors to a facial recognition system 572. In some embodiments at step 511a, the facial recognition system 572 generates a return token based on the vectors and converts that token to a pattern that the XR system 200 displays on the XR device 201. In some embodiments, the XR device 201 generates and displays the token itself. At step 512 the XR system 200 displays a visual representation or encoded feature vectors to the mobile phone or other secondary device 210 for user identification. For example, the XR device 201 may display a visual representation or encoding of the wearer's facial identification feature vector on its forward facing display, as seen in FIG. 5B. FIG. 5B shows two types of encoding, 550 and 560. Encoding 550 includes passthrough display 551 displaying facial features of a user and code 552 transmitting additional information. Encoding 560 shows only a code 561. The display and encoding are then visible to the mobile phone or other secondary device 201, which may use that information to authenticate the user. Additionally, in some embodiments where the XR device 201 provides a "reverse passthrough" capability, that is, the ability to generate on the forward facing display a representation that creates an impression that one may see through the forward facing display directly to the face of the user, the XR system 200 may display images of the user's eyes. These images, in combination with the user's visible nose, mouth and chin features may provide enough data for the mobile device or other secondary device 210 to recognize the user and unlock the device or perform other operations requiring facial recognition. The XR system 200 may perform this synthetic facial recognition in a tiered manner based on contextual security requirements. For example, a video streaming application that uses facial ID to log in may have a lower threshold for synthetic facial recognition, requiring only the nose, mouth and chin features, while a banking application may require a more comprehensive set of features such as the encoded eye features as described above.

The mobile phone or other secondary device 210 then, at step 513, attempts to recognize the user when it processes the data received at step 512 using the facial recognition system 572, as described above. At step 514, the XR system 200 validates the user using nose, mouth, and/or chin vectors and, at 515, the mobile phone or other secondary device 210 unlocks the application 574 based on the collected vectors. Step 516 represents some embodiments that require higher security, and there the facial recognition system 572 validates the user based on the full facial features. At 517, the mobile phone or other secondary device 210 unlocks the application 574 based on that validation. Once the mobile phone or other secondary device unlocks the application 574, either at step 515 or 517, the XR system 200 accesses the application 574 at 518. In some embodiments the XR system 200 causes the secondary device 210 to lock again immediately after use to ensure security.

Similarly, in the case of a secondary device 210 that requires facial recognition to interact with the device, such as Apple products using FaceID, the XR device 201 may present a scannable visual representation on its forward facing display that may be accepted by the facial ID system of the device. This authentication via "virtual FaceID", may allow the XR device 201 to lock and unlock the device as needed by the XR device 201 or XR system 200. This could involve an onscreen identifier, such as a simple QR code, or the use of the device's reverse passthrough display of the user's eyes, or a combination of reverse passthrough and a generated identifier.

In some embodiments, the system provides the visual display of the encoded facial feature vectors at differing sizes, speeds, or shapes based on the distance of the secondary device 210 seeking to validate the user. For example, if the secondary device 210 requesting facial recognition is located at a distance, such as a television set or venue entry, turnstile or kiosk device, the XR device 201 could display larger representations of the datapoints, display datapoints in a slower manner, or display datapoints in sequence rather than an all at once approach. The alternatives, faster presentation of smaller representations, may be better suited for secondary devices 210 that are closer to the wearer, a mobile phone for example. In some embodiments, the XR system 200 may use the process described in FIG. 4 to unlock a secondary device 210 in response to detecting that a user is looking at a locked secondary device 210 i.e., the locked secondary device 210 is within the view of the XR device 201.

Figure 6:
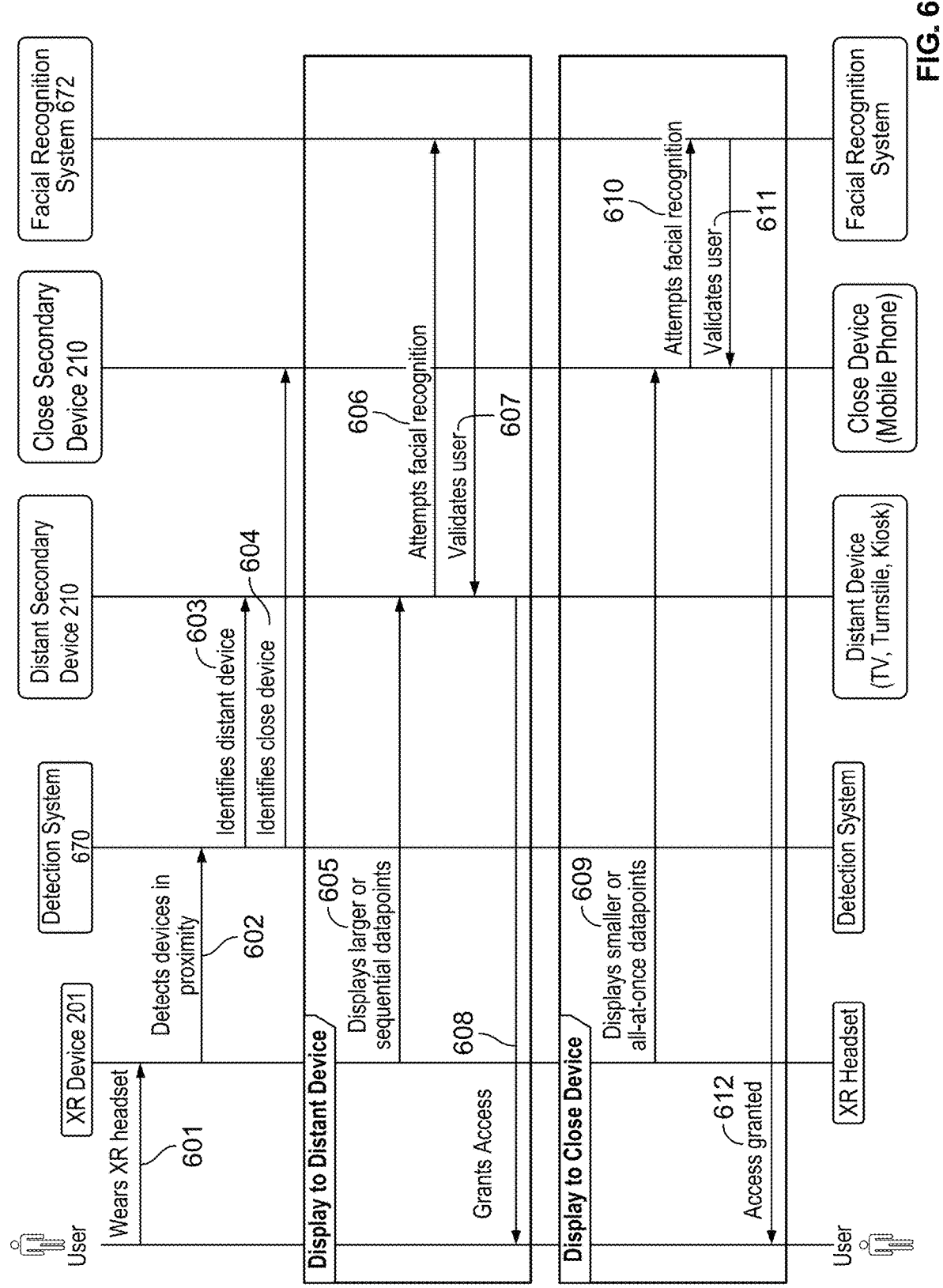
FIG. 6 illustrates variations in validating a user, in accordance with some embodiments of the present disclosure.

FIG. 6 illustrates variations in validating a user. At 601, a user is wearing an XR device 201. The XR system 200 then using a detection system 670 detects secondary devices 210 in proximity to the XR device at 602. At 603, the XR system 200 distinguishes between distant and close devices. The XR system 200 then displays different content to the distant and close secondary devices 210. At 605, the XR system 200 displays large or sequential data points to distant secondary devices 210 from the XR device 201. The system then, at 606, attempts facial recognition of a user of a distant device using a facial recognition system 672. At 607, the facial recognition system 672 validates the user of the distant secondary devices 210 and, at 608, the XR system 200 grants access to the distant secondary devices 210. At 609 the XR system 200 displays small or concurrent data points to close secondary devices 210 from the XR device 201. The XR system 200 then at 610 attempts facial recognition of a user of close secondary devices 210 using a facial recognition system 672. At 611 the facial recognition system 672 validates the user of the close secondary devices 210 and at 612 the system grants access to the close secondary devices 210.

Figure 7:
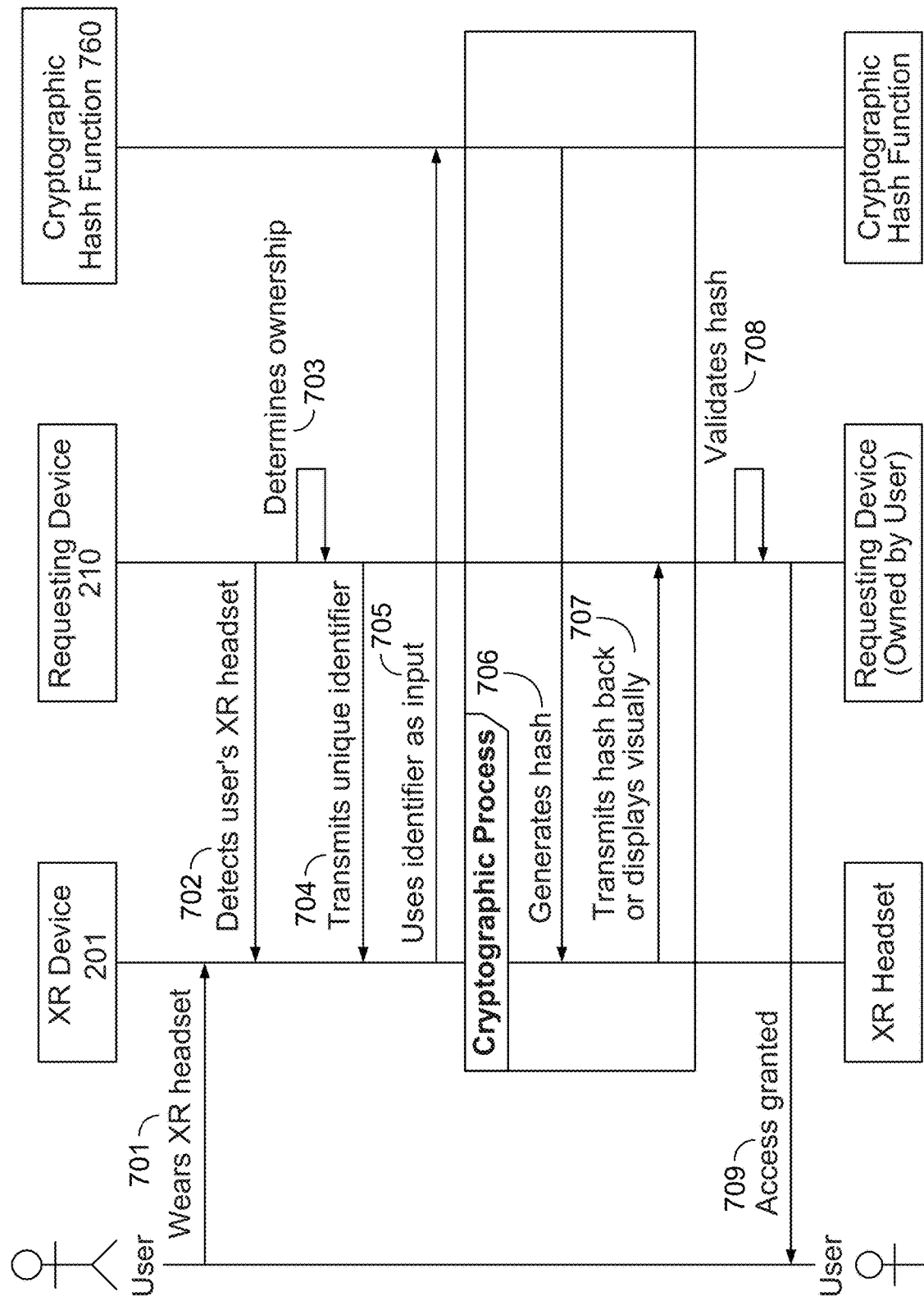
FIG. 7 shows an example process of the system interacting with a cryptographic hash function, in accordance with some embodiments of the present disclosure.

In some embodiments, the secondary devices 210 requesting facial recognition may, if the secondary device 210 is authorized, transmit a one-time use unique identifier to the XR system 200 via the XR device 201. This identifier may be used as an input to a cryptographic hash that may be transmitted back to the requesting secondary device 210 or used to generate a visual display as described in the above embodiment. FIG. 7 shows an example process of the system interacting with a cryptographic hash function. At 701, a user is wearing an XR device 201. At 702, the secondary device 210, or requesting device, detects the XR device 201. This detection may be via any known approach. At 703, the XR system 200 determines ownership of the secondary device 210. Then, in response to step 703, at 704, the XR system 200 transmits a unique identifier to the XR system 200 through XR device 201. The XR device 201, at 705, receives the identifier as input and uses it for a cryptographic hash function 760. The cryptographic process begins at step 706 where the cryptographic hash function 760 generates a hash. In response, at 707, the XR device 201 via the XR system 200 transmits, or virtually displays, the hash. The secondary device 210 then at 708 validates the hash and the XR system 200 grants access to the XR device at 709.

In some embodiments, the XR system 200, having identified a user's secondary devices 210 and their capabilities, may display a prompt to choose which secondary devices 210 to use as input devices. This selection may be as simple as selecting the secondary devices 210 from a list or by visual identification. For example, the XR system 200 may request the selected secondary devices 210 come into view of a camera on the XR device 201 or within a specific area within the view of the XR device 201. Additionally, the XR system 200 could request that the user "look" at the secondary devices 210 they wish to use during the XR session or application session, thereby bringing the secondary devices 210 into view of the XR device 201.

Figure 8:
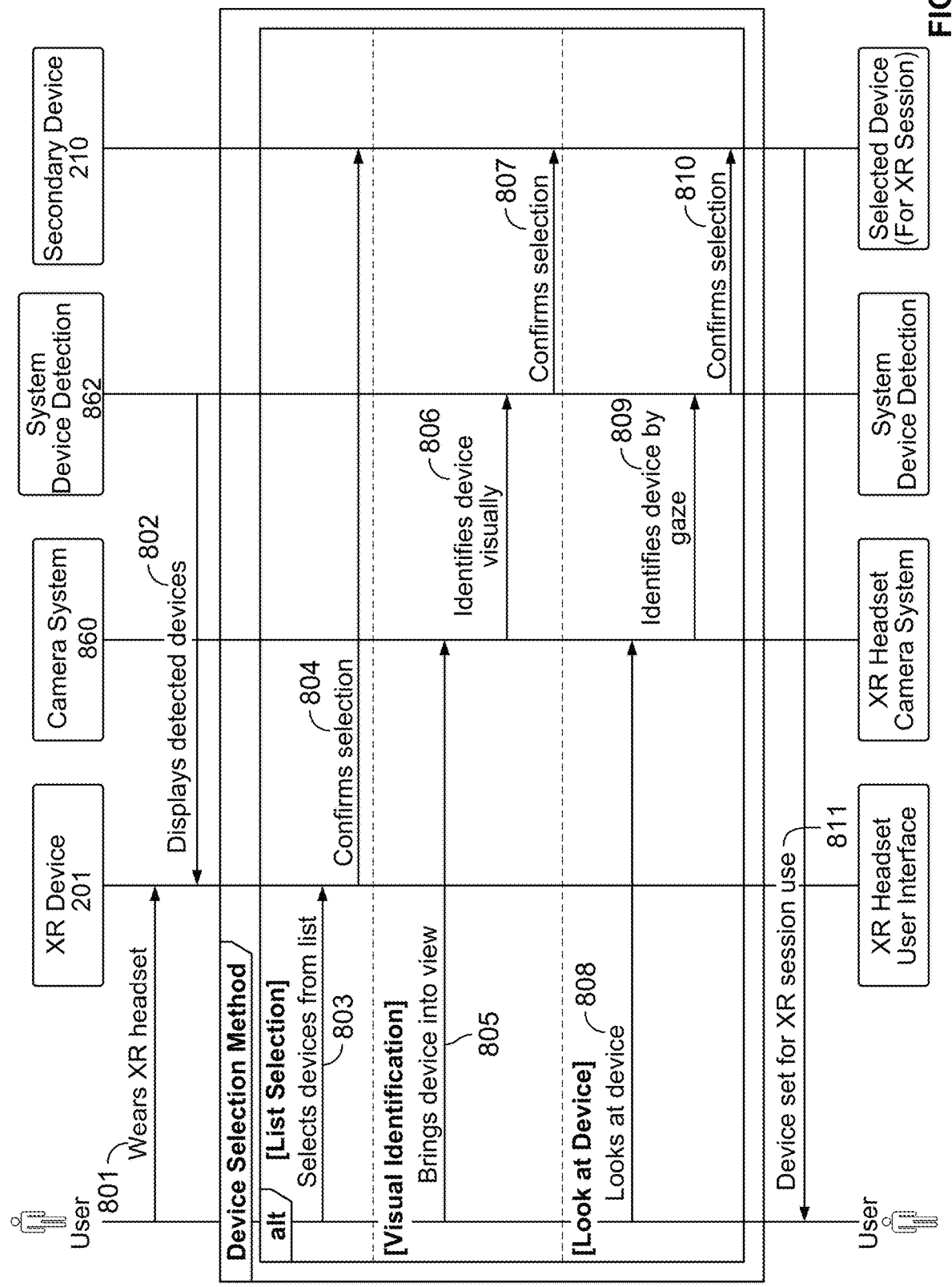
FIG. 8 shows an example process of selecting a secondary device, in accordance with some embodiments of the present disclosure.

FIG. 8 shows an example process of selecting a secondary device 210. At 801, the user is wearing the XR device 201. At 802, the system device detection 862 displays on the user interface of the XR device 201 the detected secondary devices 210. Then, XR system 200 receives a selection of the detected secondary devices 210 at 803. In some embodiments, the selection is from a list of detected secondary devices 210. The XR system 200 then confirms selection and links the secondary device 210 with the XR device 201 for use at step 804. In some embodiments, a secondary device 210 is in view of the XR device 201 camera system 860 at 805. The XR device 201 camera system 860 identifies the secondary device 210 visually based on the image it captures of the device at 806. The system device detection 862 then confirms the device selection at 807. In some embodiments, a user using the XR device 201 looks at a device at 808, i.e., the device comes into the view of the XR device 201. At 809, the XR device camera system 860 identifies the secondary device 201 by gaze using one or more images the camera system 860 captures of the secondary device 210. At 810, the system device detection 862 confirms the selection of the secondary device 210. The system then moves to step 811, where the secondary device 210 is set for XR environment use.

In some embodiments, the XR system 200 monitors for user input requests which match the capabilities of the participating secondary devices 210. For example, the system may determine that a web-based form requires, for example, textual input or date input. These input types may require that a user look at the form, such as when choosing a date or typing. If the secondary device 210 supports the input, the XR system 200 will trigger the display of the appropriate input widget on the secondary device 210. For example, in some such embodiments, a mobile phone, here, the secondary device 210, may display a calendar or date selection widget and then a full screen keyboard when moving from a first form field asking for a calendar to another field form asking for an email address. In some cases, where the user must simply confirm a selection, the secondary device 210 may present a full screen button or detect a gesture such as a swipe, shake, tap or other input which does not require a user to look at the secondary device 210. Secondary devices 210 such as rings, earbuds or other non-display secondary devices 210 could provide this simple input. More advanced controls may be provided by the running application on the XR device 201. For example, a video playback application could provide a full screen shuffle on a mobile device for navigating through a video or interacting with a music or video editing application.

Figure 9:
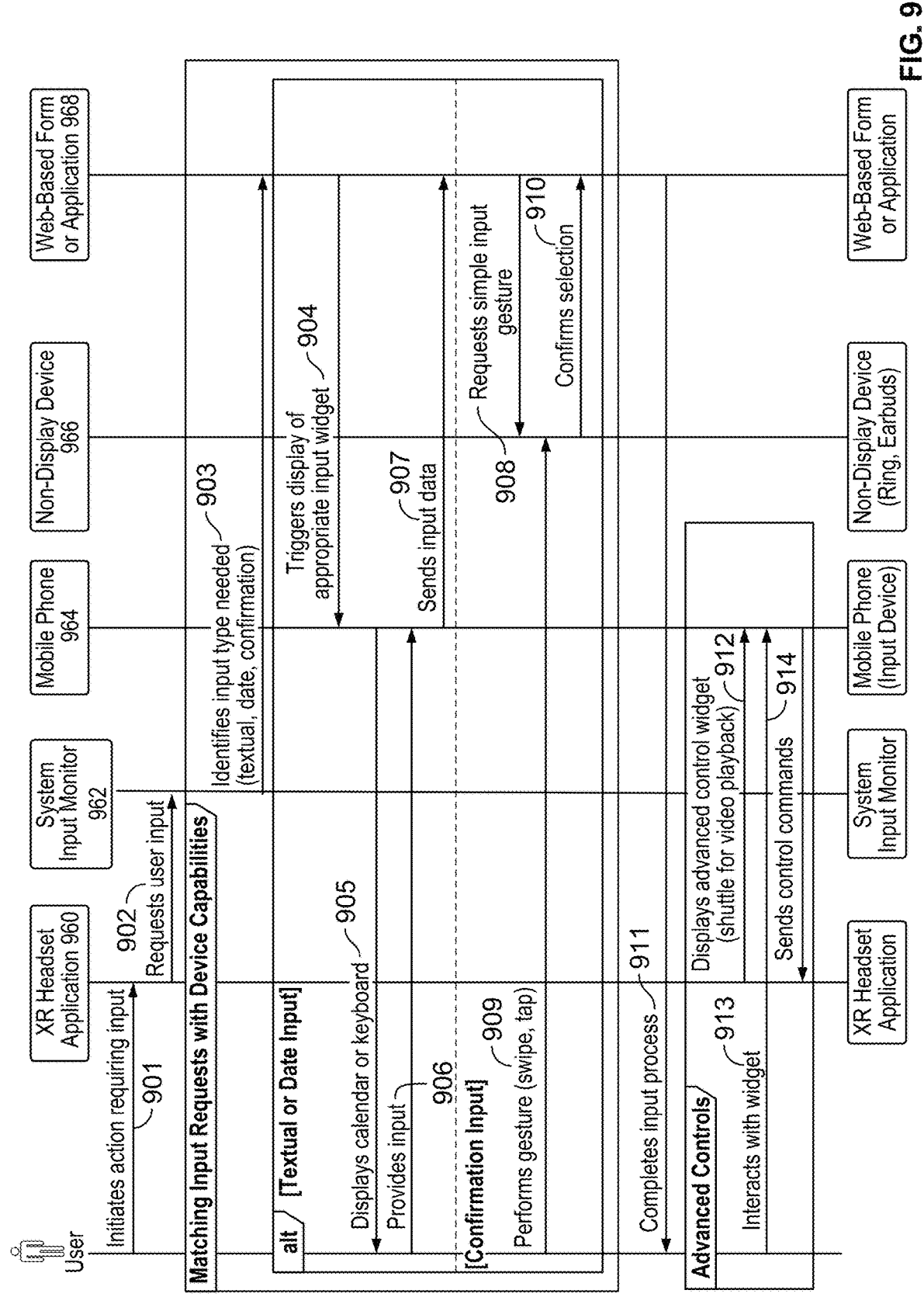
FIG. 9 shows an example method of secondary device interaction, in accordance with some embodiments of the present disclosure.

An example method of secondary device 210 interaction is shown in FIG. 9. At 901, the system initiates action based on received input from a user in an XR headset application 960 initiates an action requiring input. The system in response, at 902, requests input at the system input monitor 962. The system then moves to matching input requests with device capabilities. The system input monitor 962, at 903, identifies the input type needed, such a text, date, confirmation, etc. Alternatively, in the case of textual or date input, a web-based form or application may trigger on a mobile phone 964 or other secondary device a display of an appropriate input widget at 904. At 905, the mobile phone or other secondary device then displays a calendar or keyboard to receive the data input. At 906, the XR system 200 then receives input by way of the mobile phone or other secondary device. The secondary device, at 907, sends input data to the web-based form or application 968. In the case of confirmation input, the web-based form or application, at 908, requests on a non-displaying device 966, such as a button or headphones, a simple gesture. The XR system 200 then, at 909, receives input of the gesture, such as a swipe or tap. The non-displaying device 966 may then, at 910, confirm the selection to the web-based form or application 968. Once the web-based form or application has received the data, it indicates, at 911, that the input process is complete. The system may then, at 912, display an advanced control widget on the mobile device or other secondary device. The XR system then, at 913, receives an interaction with the advanced control widget and, at 914, the mobile device or other secondary device sends control commands to the system.

In some embodiments, the input requesting application may be brought to the foreground of the secondary device 210 on an as needed basis. For example, a video streaming application may present a "skip intro" button and simultaneously trigger the secondary device 210 to detect taps, shakes or rotations. Once the XR system 200 has received the required input or determined a lack thereof, the secondary device 210 may return to its previous state. In some cases, the secondary device 210 may require unlocking before presenting or accepting input.

Figure 10:
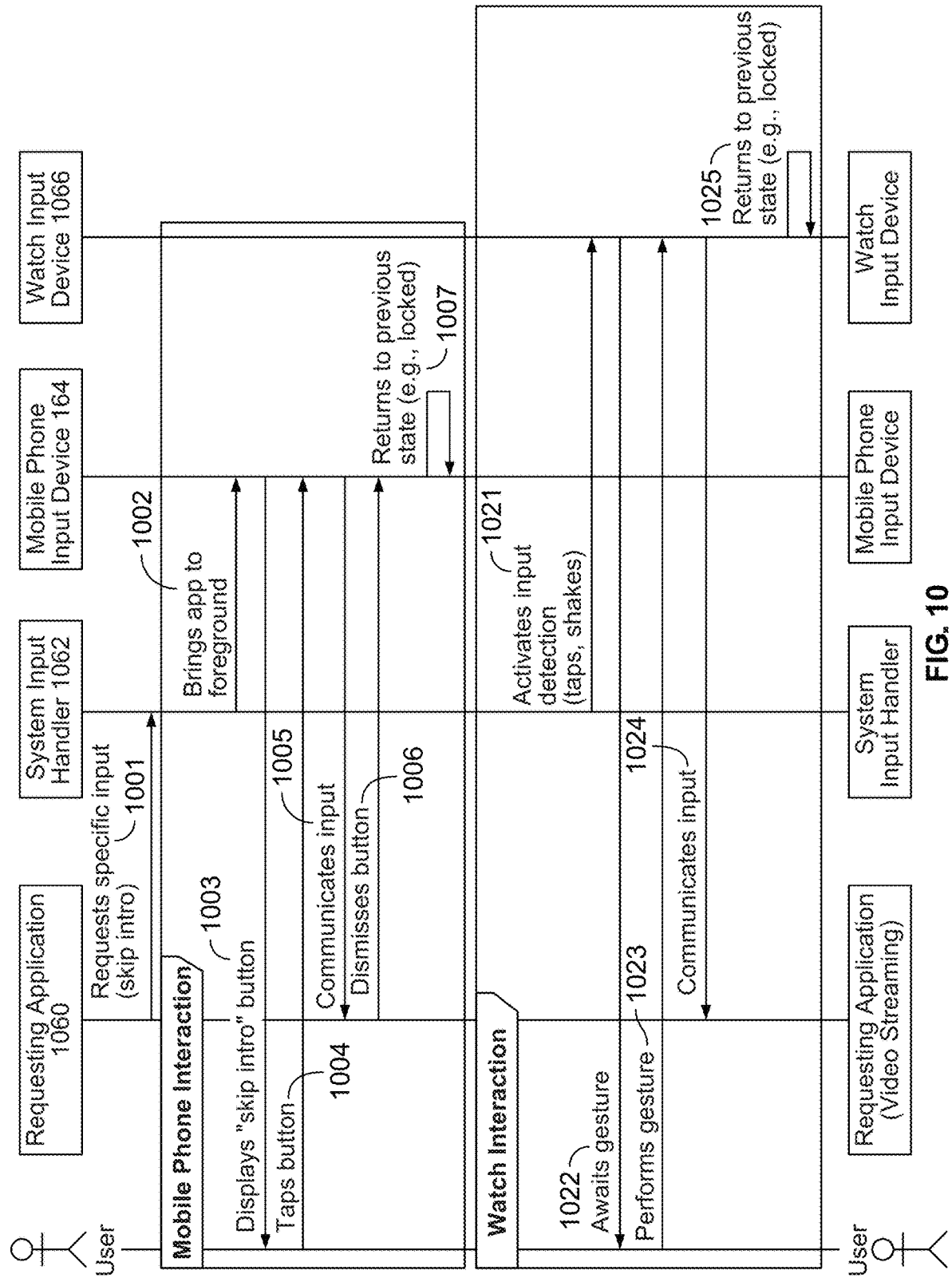
FIG. 10 shows an example process of activating the secondary device, in accordance with some embodiments of the present disclosure.

FIG. 10 shows an example process of activating the secondary device 210. At 1001, a requesting application 1060, such as a video streaming service, requests specific input to a system input handler 1062. In the event of a secondary device 210 interaction, the system input brings the application to the foreground of the secondary device 210 at 1002. The secondary device 210, at 1003, displays a "skip intro" button to a user. The XR system 200, at 1004, receives an input of a tap on a button on the secondary device 210 that makes a selection. At 1005 the secondary device 210 communicates the input to the requesting application 1060. At 1006, the requesting application transmits a dismiss button to the mobile phone input device 1064. The mobile phone input device 1064 then, at 1007, returns to a previous state, such as locked or unlocked.

In a scenario of a watch interaction, after step 1001 in which the requesting 1060 requests specific input, the system input handler 1062 on the watch input device 1066, such as the watch itself including input sensors, at 1021. Input may be for example taps or shakes. At 1022, the watch input device awaits a gesture. At 1023 the watch input device receives a gesture input and, at 1024, communicates to the requesting application 1060. After, at 1025, the watch input device 1066 returns to its previous state, such as locked or another screen previously displayed.

Figure 11:
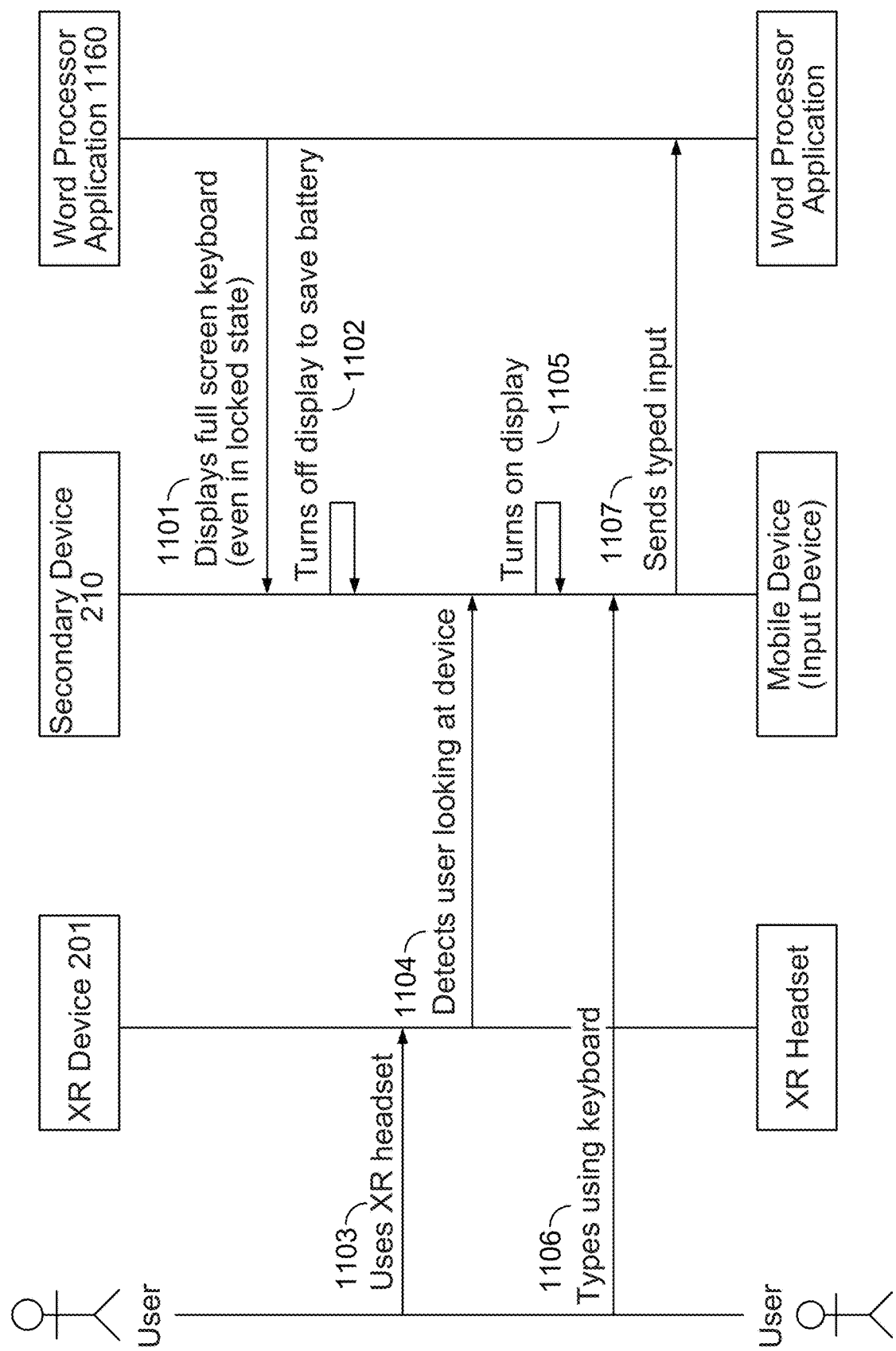
FIG. 11 shows an example process of receiving text input from a secondary device, in accordance with some embodiments of the present disclosure.

In some embodiments, a secondary device 210 may continually display an input interface to avoid frequent unlocking. For example, a secondary device 210 may display a full screen keyboard even when the device is in a locked state. In this case, the secondary devices 210 may not require automatic locking and unlocking to take advantage of the input. This approach is useful for tasks that are of longer duration, such as typing in a word processor application. In such a situation, the secondary devices 210 may turn off or dim its display or a portion thereof. The XR system 200, however, may trigger the secondary devices 210 to turn the display on when it determines that the user looks at the secondary devices 210. In some embodiments only a present application or interface may be displayed while other elements of the secondary device 210 remain inaccessible. FIG. 11 shows an example process of receiving text input from a secondary device 210. At 1101, a word processing application 1160 displays a full screen keyboard on a mobile phone or other secondary device 210. At 1102, a mobile phone, or secondary device 210, turns off its display to save battery. At 1103, XR system 200 detects input on an XR device 201. The XR system 200 via the XR device 201 at 1104 detects the user looking at the mobile phone or secondary device 210. The mobile phone or secondary device 210 then turns on its display at 1105. The XR system detects typing using the keyboard on the mobile phone or secondary device 210 at 1106. At 1107, the mobile phone or secondary device 210 sends typed input to the word processing application 1160.

Figure 12:
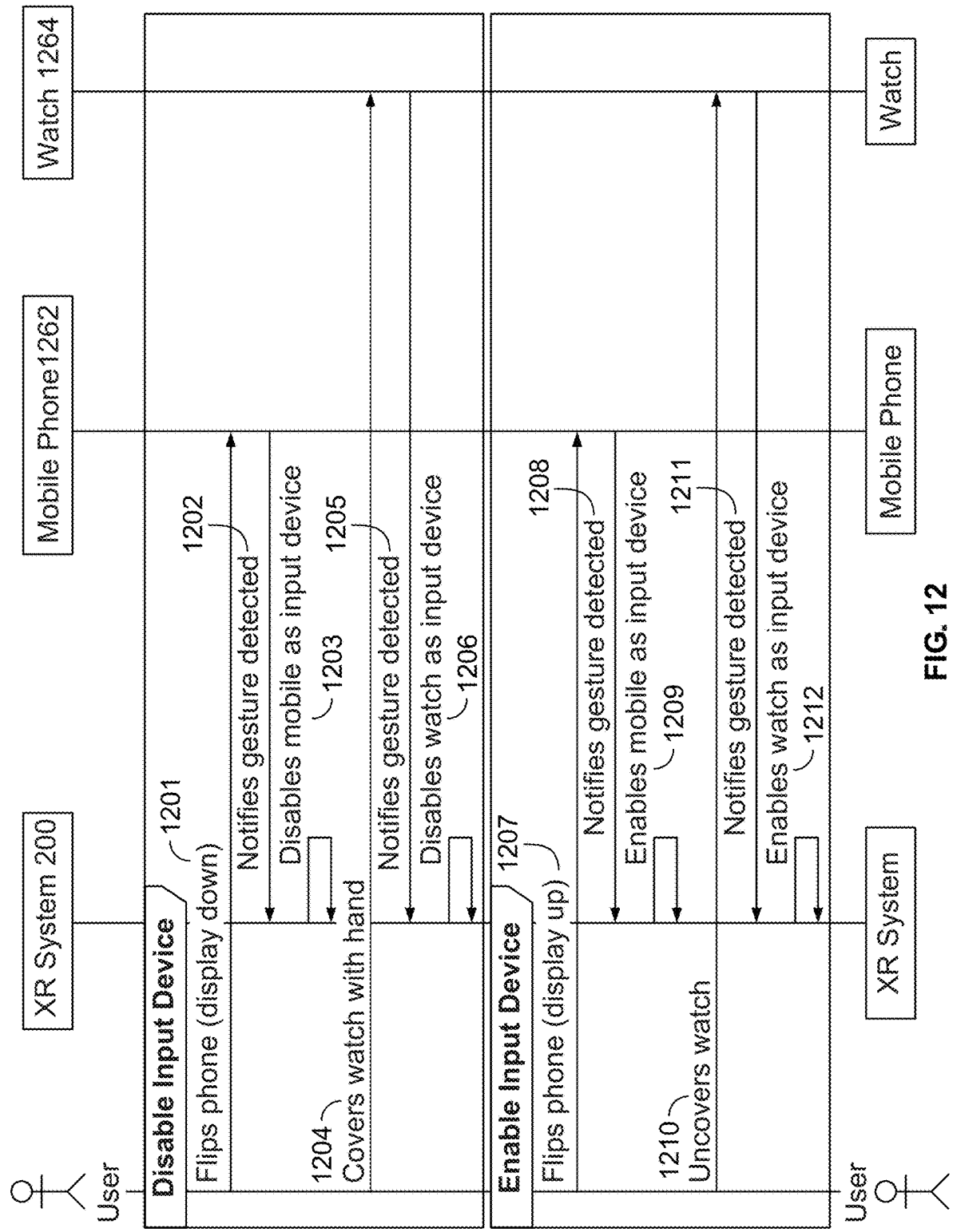
FIG. 12 shows a process of disabling the use of a secondary device, in accordance with some embodiments of the present disclosure.

In some embodiments, the XR system 200 may disable the use of a secondary device 210 after detecting a gesture. For example, turning a mobile phone over so that the display is on the bottom may disable use of the mobile phone. Covering a watch with a hand may have the same effect. Conversely, a similar gesture may be used to enable the secondary devices 210 as an input device to the XR system 200. FIG. 12 shows an example process of some such embodiments. At 1201, the XR system 200 detects a turn of a mobile phone 1262, here secondary device 210, display down. The mobile phone 1262 or secondary device 210 detects this gesture and notifies the XR system 200 at 1202. The XR system 200 then, at 1203, disables the mobile phone 1262 or secondary device 210 as an input device. At 1204, the XR system 200 detects a watch 1264, a second secondary device 210, is covered, for example by a hand. The watch 1264 then, at 1205, detects this gesture and notifies the XR system 200 of the detected gesture. At 1206, the XR system 200 disables the watch 1264. At 1207, the XR system 200 detects a turn of a mobile phone 1262, here secondary device 210, display up. The mobile phone 1262 or secondary device 210 detects this gesture and notifies the XR system 200, at 1208. The XR system 200 then, at 1209, enables the mobile phone 1262 or secondary device 210 as an input device. The XR system 200 detects, at 1210, that the watch 1264 is uncovered. The watch 1264 then, at 1211, detects this gesture and notifies the XR system 200 of the detected gesture.

Figure 13:
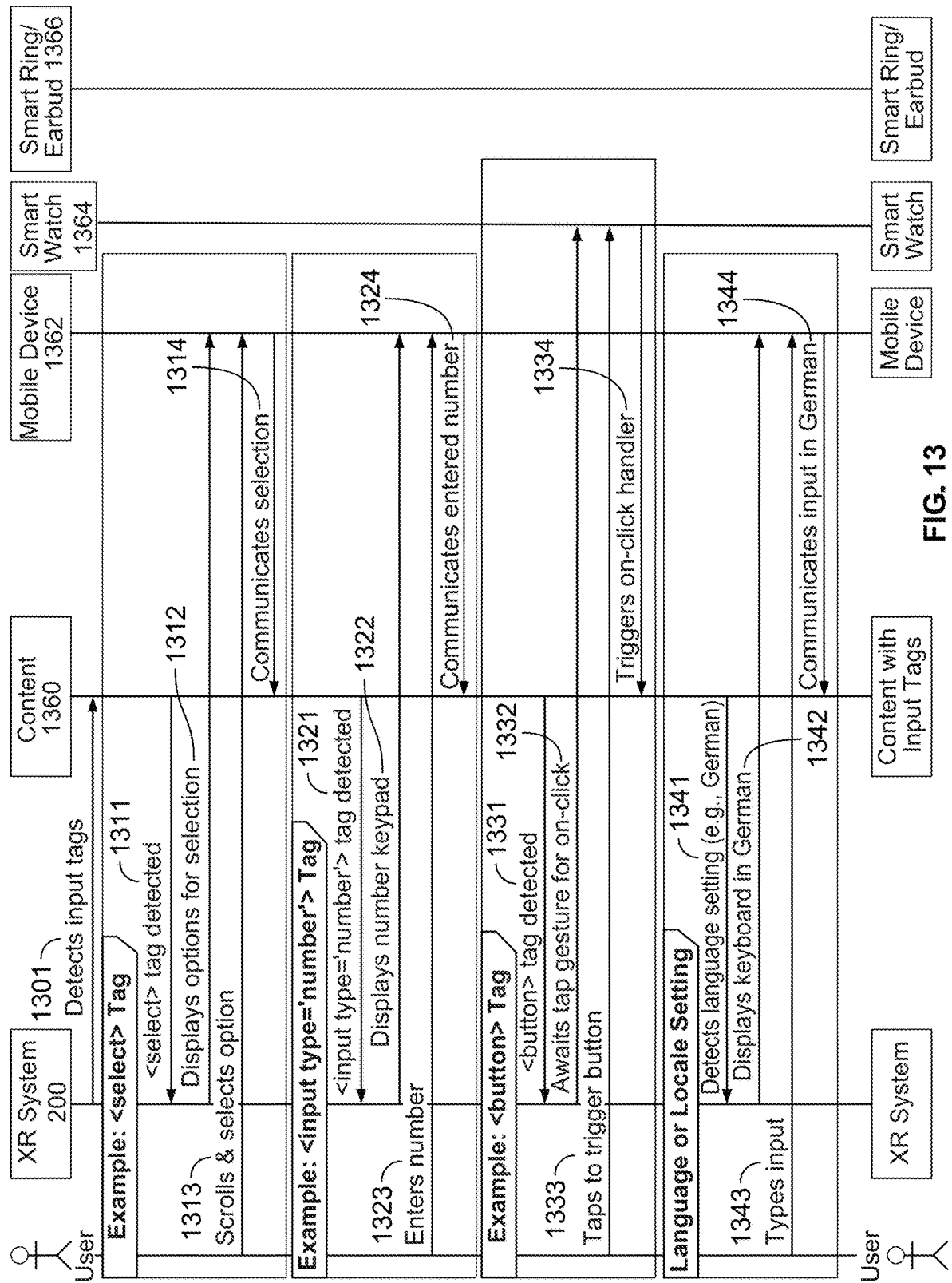
FIG. 13 shows an example process of adjusting an interface based on the type of input requested, in accordance with some embodiments of the present disclosure.

In some embodiments, the XR system 200 may detect in a receiving application or script metadata such as hypertext markup or other "tags" that indicate a type of user input and accordingly indicate the XR system 200 should display such data to the user, either on the display of the XR device 201 or the secondary device 201. For example, the html tags "<input>, <textarea>, <button>, <select> each indicate a specific type of input. The XR system 200 may interpret these tags as well as others and in response present an interface that is suitable for the type of input required. For example, a <select> tag may cause the XR system 200 to display possible options for selection and/or allow a scroll through a list of possible choices. In another example, a <input> tag with a "type" attribute of number may cause the XR system 200 to present a number keypad. A "password" type may cause the XR system 200 to display a more secure interface. An input gesture such as a tap on a watch, a mobile phone's screen, a smart ring or an earbud may trigger a <button> tag's on-click handler. In some embodiments, the XR system 200 is aware of the capabilities of the participating devices and may choose one as the preferred input based on the context. Further metadata such as a language or locale setting may trigger the display of a corresponding keyboard. FIG. 13 shows an example process of adjusting an interface based on the type of input requested. At 1301, the system detects input tags from content 1360. In some embodiments, in which the system detects a "select," the process moves to step 1311 in which the XR system 200 detects the select tag. The system then, at 1312, displays options for selection on the mobile phone 1362 or secondary device 210. The XR system 200 then, at 1313, may detect a scroll and selection of an option, inputting the selection to the mobile phone 1362 or secondary device 210. The mobile phone 1362 or secondary device 210 then, at 1314, communicates the selection to the content 1360.

In some embodiments, with a number input type, the XR system 200 may first, at 1321, detect from the content 1360 an "<input type='number'>" tag. At 1322, the XR system 200 displays a number keypad on the mobile phone 1362 or secondary device 210. The XR system 200 detects an entered number, at 1323, and, at 1324, the mobile phone 1362 or secondary device 210 communicates that number to the content 1360.

In some embodiments, the XR system 200 detects a button tag. In that scenario, the XR system 200 first detects a "<button>" tag in the content at 1331. At 1332, the XR system 200 awaits a tap gesture from a smartwatch 1364 or smart ring earbuds 1366, or secondary device 210. At 1333, XR system 200 detects a tap on the smartwatch 1364 or smart ring earbuds 1366 which triggers the button. At 1334, the smartwatch 1364 or smart ring earbuds 1366 triggers an on-click handler.

In some embodiments, the XR system 200 detects a language setting, for example, at step 1341. In that scenario, the XR system 200 may display a language specific keyboard on the mobile device 1362, secondary device 220, at 1342. The XR system 200 detects input from the keyboard, at 1343, and at 1344 the mobile device 1362 secondary device communicates that input to the XR system 200.

In some embodiments, the XR system 200 may trigger the presentation of a word keyboard and populate the word keyboard with selectable words in place of characters based on the context of the application. The words included on the keyboard may be chosen or updated based on auto-complete possibilities or previous text inputs. For example, an application may be composing an email about a car repair. The word keyboard would initially include standard introductions or sentence starters. As the XR system 200 detects selected words, the word options, here the keys of the keyboard, would update and be replaced by words that are the most likely words.

Figure 14A:
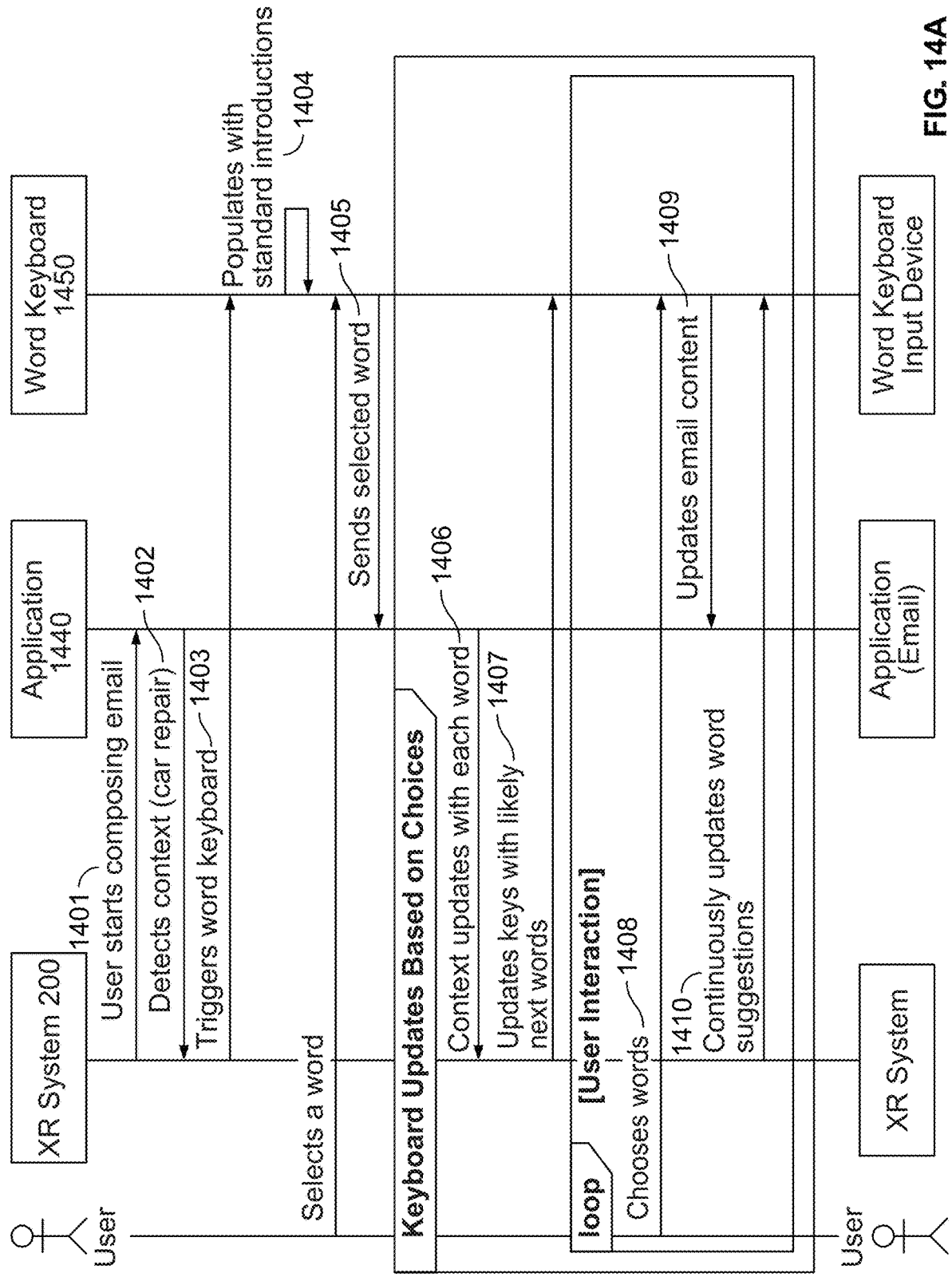
FIG. 14A shows an example process of generating and updating a word keyboard, in accordance with some embodiments of the present disclosure.
Figure 14B:
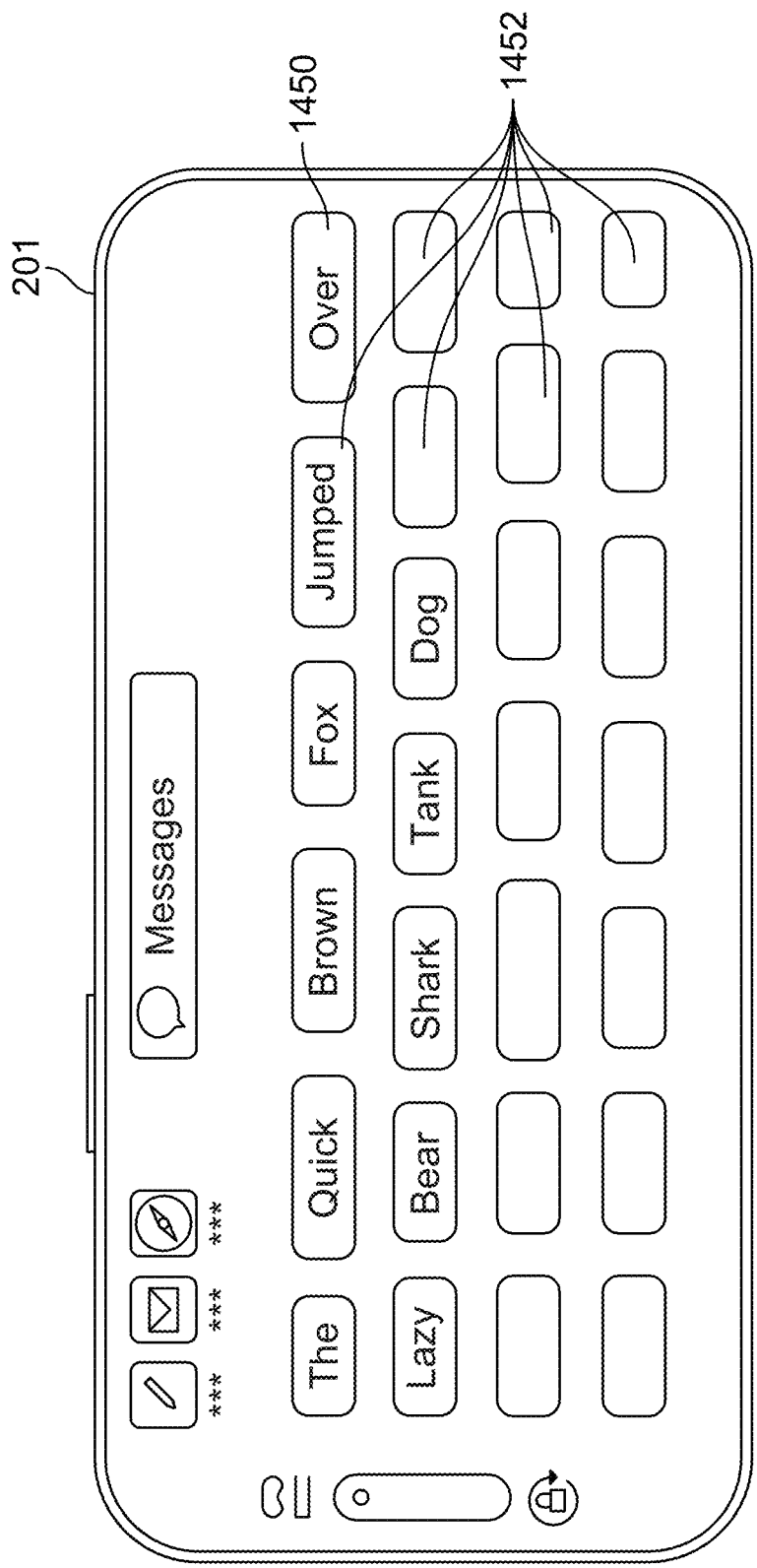
FIG. 14B shows an example word keyboard overlaid on a secondary device, in accordance with some embodiments of the present disclosure.

FIG. 14A shows an example process of generating and updating a word keyboard, in accordance with some embodiments of the present disclosure. An example word keyboard 1450 is shown overlaid on secondary device 210 in FIG. 14B. At 1401, the XR system 200 starts composing an email in an email application 1440. The application detects the context of the email, for example, a car repair, and sends the context of the email to the XR system 200. In response the XR system 200, at 1403, triggers a word keyboard 1450 on a secondary device 210, such as a mobile phone, based on the context. The XR system 200 may choose words to be included on the keyboard 1450 based on auto-complete possibilities or previous textual inputs. For example, if the XR system 200 detects composition of an email about a car repair, the word keyboard 1450 would initially include standard introductions or sentence starters at 1404. As the XR system 200 detects selection of words, at 1405, the "keys" update and are replaced by the most, or more, likely to be selected words. FIG. 14B illustrates an example word keyboard 1450 with keys 1452. The input device then at 1406 sends the selected words to the application 1440. In some embodiments, the keyboard 1450 updates the words available based on selections. For example, after the input device, either the XR device 201 or the secondary device 210, sends the selected words to the application, the XR system 200 may, at 1406, update the detected context to have an association with each word. Accordingly, at 1407, the XR system 200 updates the keyboard 1450 with predicted next words. The update process may then continue as a loop. For example, the loop may begin at step 1408, in which the XR system receives a selection of a word on the input device. The application 1440 then, at 1409, updates the context. At 1410, the XR system 200 continuously updates word suggestions, and the loop returns to 1408 with additional word selections.

Figure 15A:
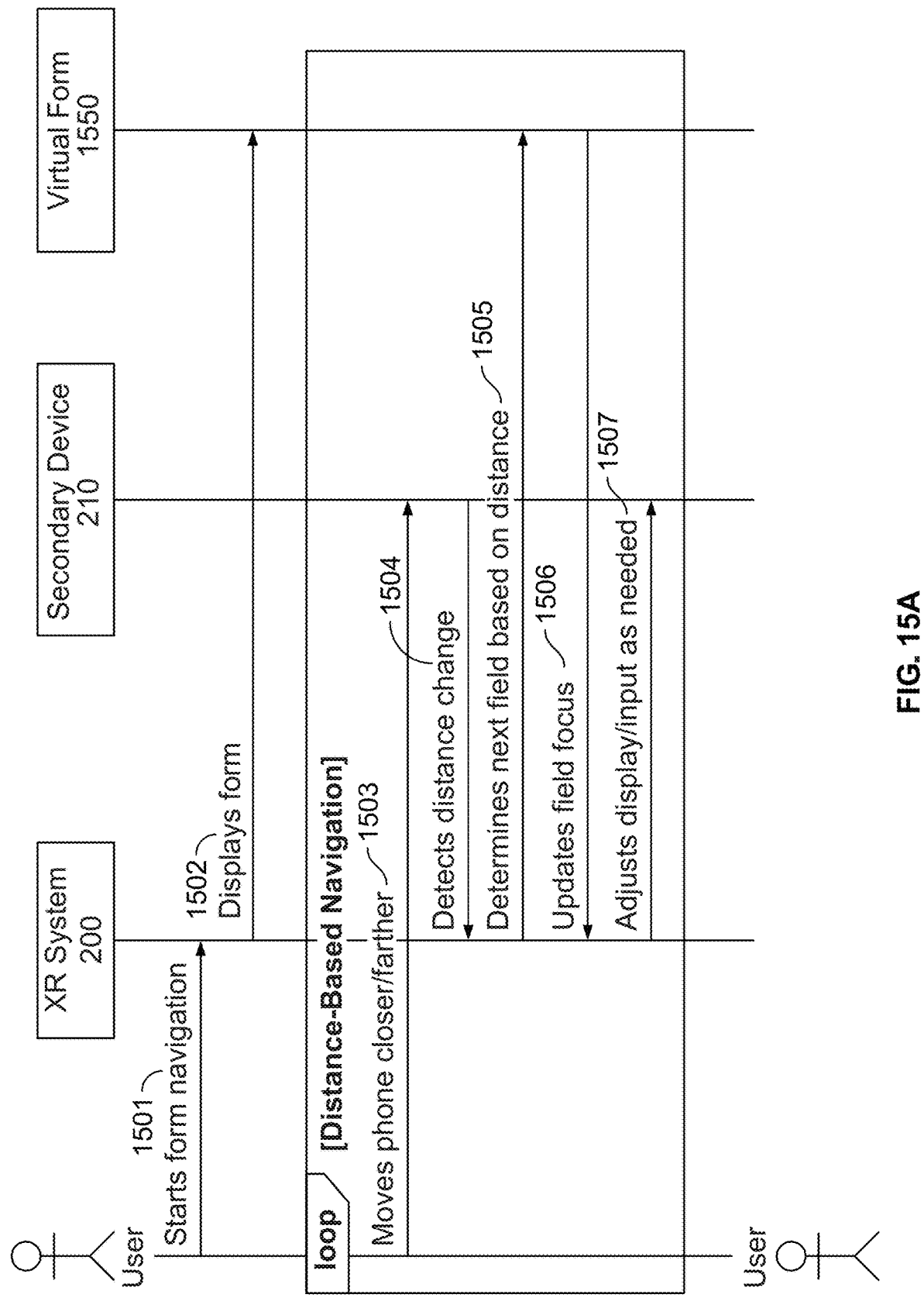
FIG. 15A shows an example process selecting an input field based on a change of distance to a secondary device, in accordance with some embodiments of the present disclosure.
Figure 15B:
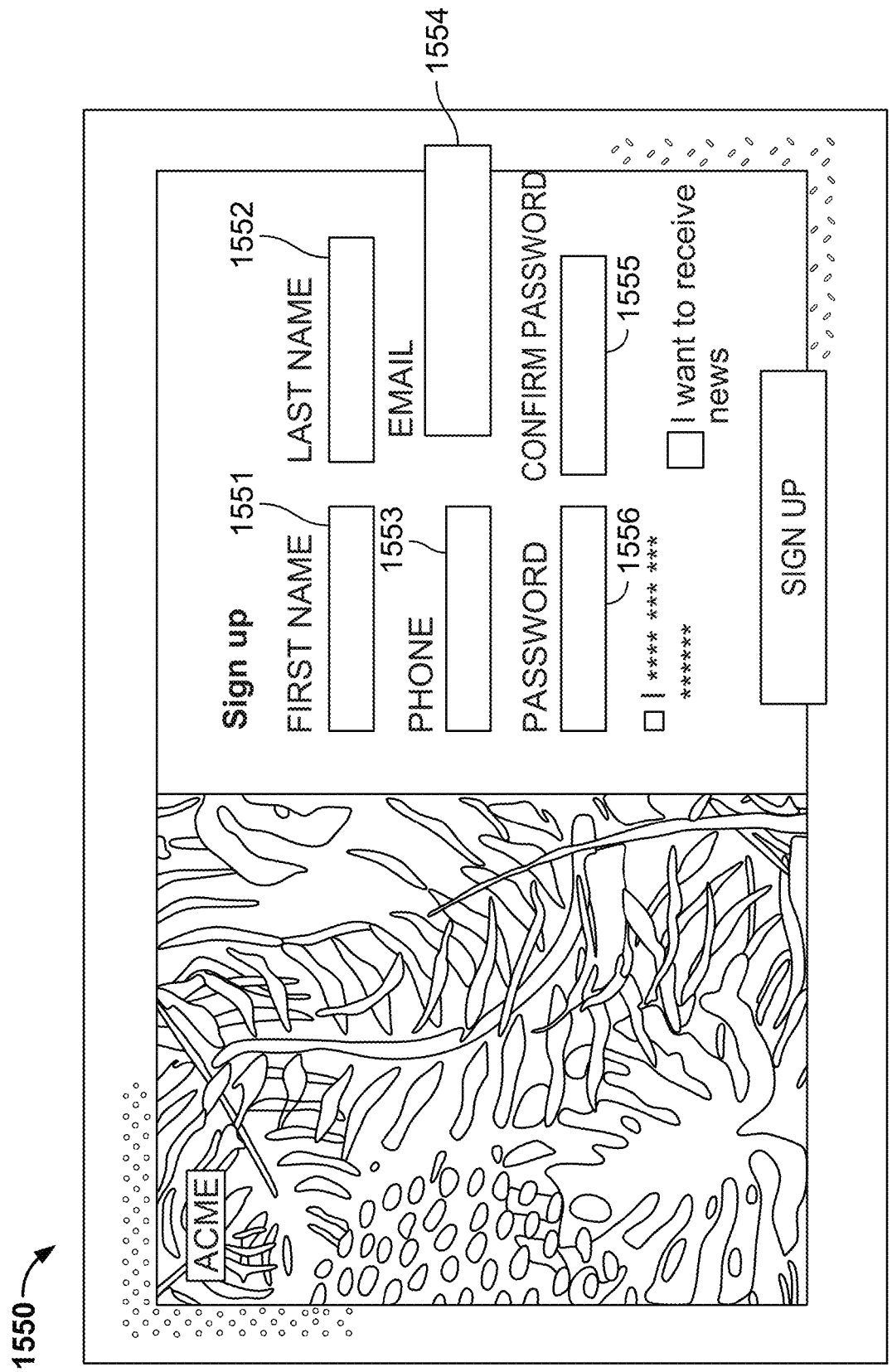
FIG. 15B shows an example virtual form, in accordance with some embodiments of the present disclosure.
Figure 15C:
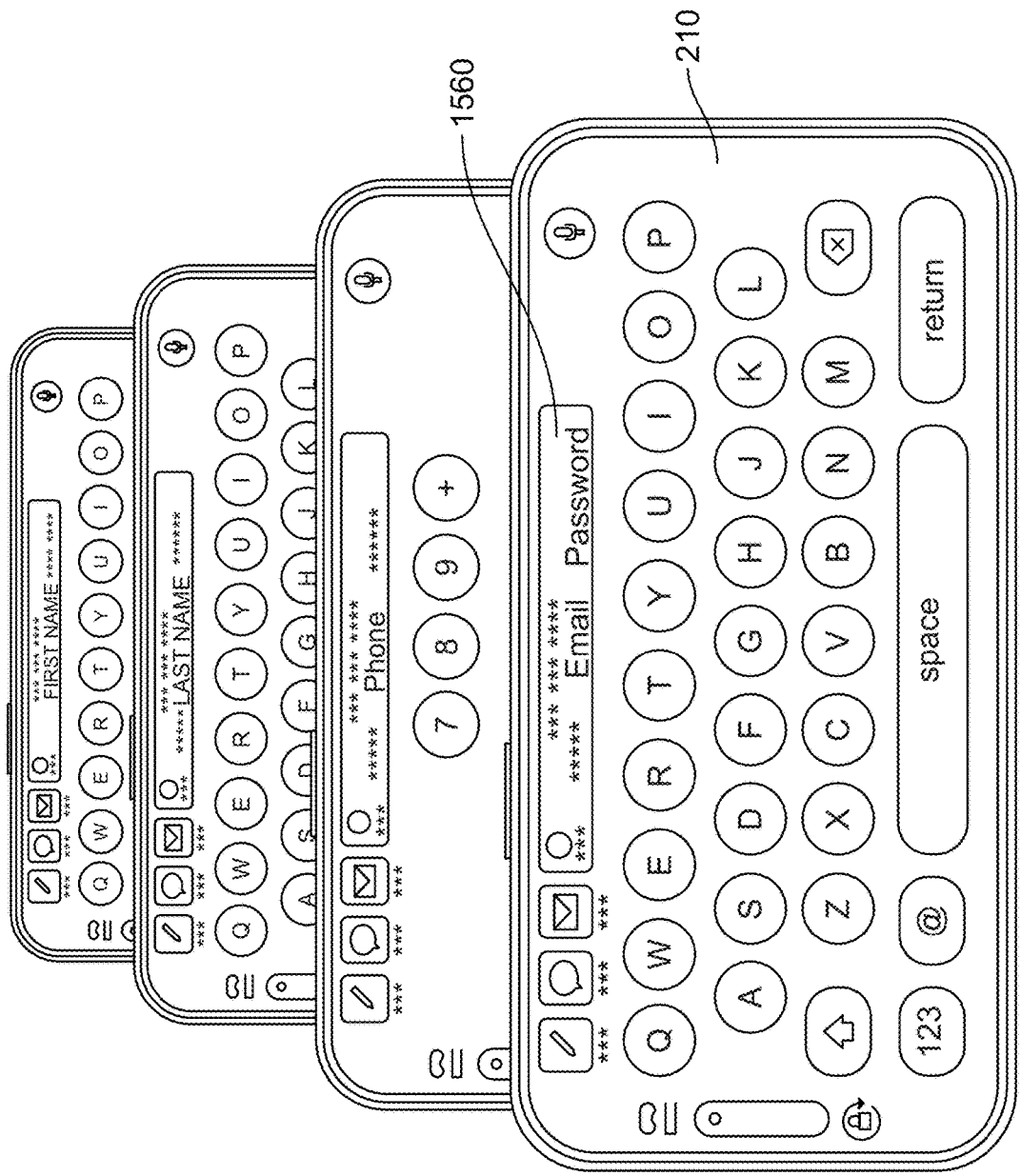
FIG. 15C shows an example application with an indicator that indicates which entry a secondary device is engaging, in accordance with some embodiments of the present disclosure.

In some embodiments, the XR system 200 may detect the distance of a secondary device 210 and consider the distance when determining which form field or input to display. For example, a user using a mobile phone as an input device may move the phone closer to or farther away from the XR device 201 to navigate a form. These actions may be similar to how an airplane rudder is used to change altitude in an airplane. In this manner, the user may focus on the input device and may not be required to divide focus between the virtual form in the XR device 201 and the input device, i.e., secondary device 210. FIG. 15A shows an example process selecting an input field based on a change of distance to a secondary device 210. At 1501, the XR system 200 detects navigation using a mobile phone or secondary device 210 in accordance with the embodiments described above. The XR system 200 then, at 1502, displays a virtual form 1550 in the XR device 201. Virtual form 1550 can be seen in FIG. 15B with form fields 1551-1556. At 1503, the mobile phone or secondary device 210 moves close to or farther from a user's face, as seen in FIG. 15A. At 1504, the XR system 200 detects the change in distance using any suitable technique. At 1505 the XR system 200 determines a field of the form based on distance. The XR system 200 then, at 1506, updates the field focus on the display of the virtual form on the XR device 201. In some embodiments, as seen in FIG. 15C, the keyboard or application may display an indicator 1560 that indicates which entry secondary device 210 is engaging at the moment. At 1507, the XR system 200 adjusts the display and input as needed, either entering information or moving to the next view.

Figure 16:
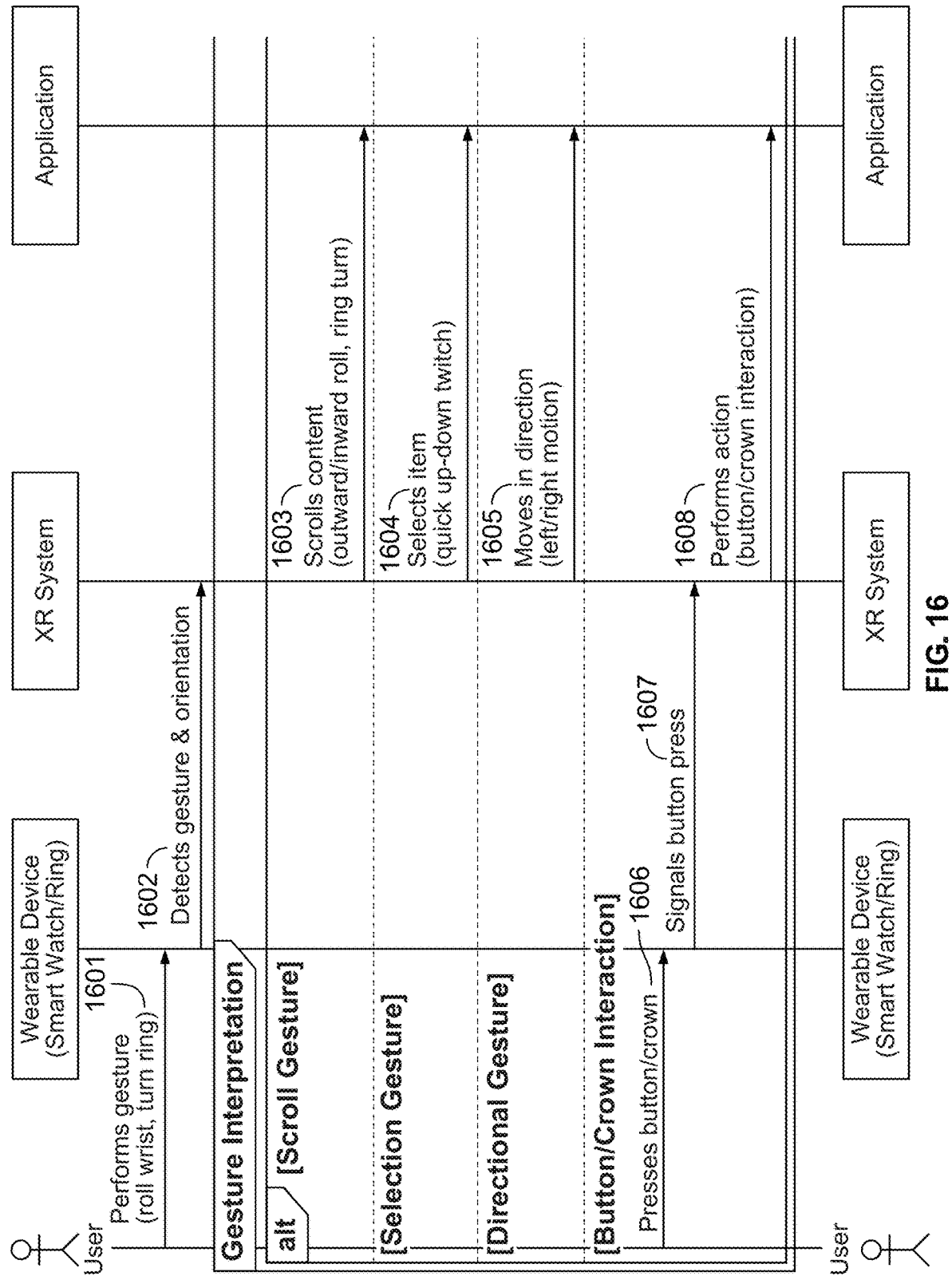
FIG. 16 shows an example of receiving input from a wearable device, in accordance with some embodiments of the present disclosure.

In some embodiments, a smart ring or other such wearable device incorporating an inertial movement module capable of determining its orientation in 3-Dimensional space may be used as a secondary device 210 in various situations as required by an application or XR system 200. For example, a scrollable input may be performed through a roll of the user's wrist outwards or inwards or by turning a smart ring on one's finger in a forward or reverse direction. A selection may be performed by a simple quick up-down "twitch" motion. These motions or gestures may also be adjusted via a user settings application. A quick left or right motion could be used to choose a left or right direction in a horizontal scrolling input. Additional features of the device such as buttons or a digital crown may be utilized by the system as well. FIG. 16 shows an example process of the present XR system 200 using a wearable secondary device 210. At 1601, a user 1660 performs a gesture, such as, for example, rolling a wrist, or turning a ring of a wearable secondary device. In some embodiments, the gesture is a scroll gesture. In some embodiments, the gesture is a selection gesture. In some embodiments, the gesture is directional. At 1602, the wearable device detects the gesture and orientation of the wearable device. Upon detecting the gesture, at 1603 the XR system 200 scrolls content on an application 1662. Upon detecting a selection gesture, such as a tap, at 1604, the XR system 200 selects content on the application 1662. Upon detecting a directional gesture, at 1605, the XR system moves content on an application. In some embodiments, the gesture is a button or crown interaction. For example, as shown, at 1606, the XR system may receive an indication that a user 1660 has pressed a button or crown. Once the wearable device detects a gesture then, at 1607, it signals the input to the XR system 200. Upon detecting the gesture, the XR system 200 performs the action.

Figure 17:
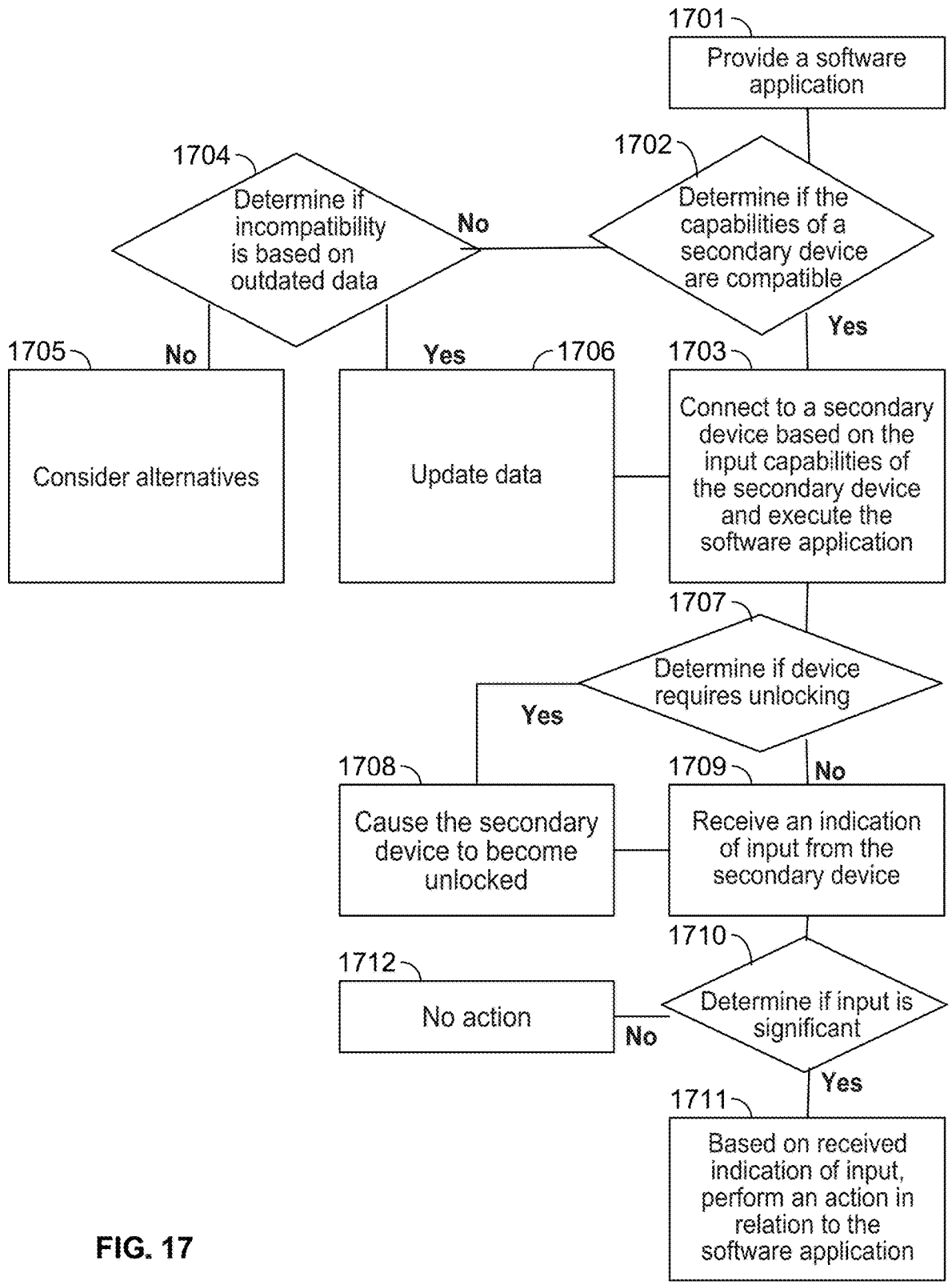
FIG. 17 shows an example method for integrating a secondary device into an XR environment, in accordance with some embodiments of the present disclosure.

FIG. 17 shows an example process of the XR system 200. In various embodiments, the individual steps of process 1700 may be implemented by one or more components of the devices, methods, and systems of FIGS. 1-16 and may be performed in combination with any of the other processes and aspects described herein. Although the present disclosure may describe certain steps of process 1700 (and of other processes described herein) as being implemented by certain components of the devices, methods, and systems of FIGS. 1-16, this is for purposes of illustration only, and it should be understood that other components of the devices, methods, and systems of FIGS. 1-16 may implement those steps instead.

At 1701, control circuitry of the XR system 200 (such as, for example, one or more of processors 202, 212, 222, or 242) provides a software application on XR device 201, such as XR headset 111. The control circuitry may store the application software on one of memories 205, 215, 225, or 245. At 1702, the control circuitry identifies surrounding secondary devices 210 such a mobile phone or smartwatch and determines if the capabilities of the secondary device 210, such as smartphone 112, are compatible with the XR system 200. For example, the control circuitry may determine that a smartphone is nearby and verify that it belongs to a user of the XR system 200. The control circuitry may also determine compatibility with the XR system 200. For example, determining compatibility may include determining that operating software on the secondary device 210 is not out of date. Determining compatibility may also include determining that the device is capable of a specific function the software application requires, such as receiving text input. The system may recognize the device in several ways. One way is through broadcasting a message to all devices that includes a one-time or multi-session token. This token may be displayed on the screen of the device if the device has a display. The token is then read by the XR system to include the device as an input device for the XR session or for use by a particular application. Another method is again via broadcasting a message to the devices and accepting user inputs for each device, for example, accepting an opt-in message on the device. Another method is through user preferences. For example, a user may indicate to use a specific device as input whenever requested by the XR system 200. Another method is through the use of computer vision and the XR system's 200 ability to recognize the type of device that the XR system 200 captures. For example, if the XR system 200 is aware that both a mobile device and a smartwatch are nearby and belong to the user and the user presents the mobile device to the XR cameras, the XR system 200 may differentiate between the smartwatch and the mobile device and choose the mobile device as the only input.

If the XR system 200 determines that that capabilities of the secondary device 210 are compatible, the control circuitry connects the XR system 200 to a secondary device 210 via connection 250 based on the input capabilities of the secondary device 210 and executes the software application. If the secondary device 210 is not compatible the process moves to 1704, where it determines if the incompatibility is based on outdated data, such as outdated software. If the incompatibility it not based on outdated data, at 1705, the control circuitry may consider alternatives such as an alternative secondary device 210 or relying on an interface of the XR device 201.

If the incompatibility is based on outdated data, the control circuitry may cause the data to be updated at 1706. Updating data may include causing the secondary device 210 to update operating software or an installed application, for example. In some embodiments, after updating the data, the process returns to 1703 to connect to the now compatible device.

After 1703, the process moves to 1707 to determine if the secondary device 210 requires unlocking, as seen in, for example, timepoint 110 of FIG. 1. This determination may be based on detecting a lock screen or other responses from secondary device 210. If the secondary device 210 is locked and requires unlocking, the process moves to step 1708 where the control circuitry causes the secondary device 210 to become unlocked, similar to timepoint 120b in FIG. 1. Control circuitry may cause a secondary device 210 to become unlocked by transmitting data to the device that identifies the user. For example, the XR system 200 may collect biometric data of the user and based on that data transmit facial data sufficient to unlock a secondary device with facial recognition.

If the secondary device 210 does not require unlocking at 1707, or has become unlocked at 1708, the process moves to 1709, where the control circuitry receives an indication of input from the secondary device 210. In one example, the XR system 200 may receive textual input. In another example, the XR system 200 may receive tapping on a watch face. At 1710, the control circuitry determines whether the input has significance based on the context. For example, if the XR system 200 receives text input when the XR system 200 is in an email application, it may determine the input is drafting an email. In another example, when the XR system 200 receives a series of taps while in a streaming application, it may determine that the input likely has no intention. For example, the tapping may be a nervous reaction. The process then ignores such input. If the control circuitry determines that the input has significance, at 1711, it performs an action in relation to the software application based on the received indication of input. If it determines that the input is not significant, it performs no action at 1712.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any embodiment may be applied to any other embodiment herein, and flowcharts or examples relating to an embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. An extended reality (XR) head-mounted device (HMD), comprising:
   input/output (I/O) circuitry; and
   control circuitry configured to:
   provide an application to a user wearing the XR HMD, wherein the application is associated with an input type;
   detect a plurality of devices proximate to the XR HMD;
   determine respective input capabilities for each device of the plurality of devices;
   select a first device of the plurality of devices to connect to the XR HMD based on determining that the respective input capabilities of the first device match the input type associated with the application;
   wherein the I/O circuitry is configured to establish a connection between the first device and the XR HMD; and
   wherein the control circuitry is further configured to:
   cause the first device to be unlocked;
   receive an indication of input from the first device; and
   based on the received indication of input, perform an action in relation to the application being provided via the XR HMD.

2. The XR HMD of claim 1, wherein the control circuitry is further configured to cause the first device to enter a low power mode, wherein a display of the first device is powered off when the first device is in the low power mode, and wherein the input from the first device is input while the first device is in the low power mode.

3. The XR HMD of claim 1, wherein the control circuitry is further configured to output a user interface from the mobile device as an overlay on the XR HMD.

4. The XR HMD of claim 1, wherein causing the first device to be unlocked comprises identifying facial features of the user based on biometric data of at least a portion of a face of the user captured by a sensor of the XR HMD, and wherein the first device authenticates the user based on the captured biometric data.

5. The XR HMD of claim 4, wherein causing the first device to be unlocked is based on a generated encoding, wherein the generated encoding is indicative of the captured biometric data.

6. The XR HMD of claim 1, wherein the control circuitry is further configured to:
   detect an opportunity for input in the application provided via the XR HMD;
   enable input on the first device in relation to the application provided via the XR HMD for a limited time following the detecting of the opportunity for input; and
   wherein the receiving the indication of input from the first device is during the limited time.

7. An extended reality (XR) head-mounted device (HMD), comprising:
   input/output (I/O) circuitry, and
   control circuitry configured to:
   provide an application to a user wearing the XR HAMID;
   connect, to the XR HMD, a mobile device of the user based on input capabilities of the mobile device;
   wherein the I/O circuitry is configured to establish a connection between the mobile device and the XR HMD; and
   wherein the control circuitry is further configured to:
   detect an opportunity for input in the application provided via the XR HMD;
   cause the mobile device to be unlocked;
   enable input on the mobile device in relation to the application provided via the XR HMD for a limited time following the detecting of the opportunity for input;
   receive, during the limited time and from the mobile device, an indication of input in relation to the application provided via the XR HMD; and
   based on the received indication of input, perform an action in relation to the application being provided via the XR HMD,
   wherein the enabling comprises enabling only input of a specific input type on the mobile device in relation to the application during the limited time.

8. The XR HMD of claim 1, the control circuitry is further configured to:
   detect visual anchors in relation to the first device; and
   provide an overlay anchored to the first device using the detected visual anchors.

9. The XR HMD of claim 1, wherein the control circuitry is further configured to:
   detect an incompatibility between the first device and the XR HMD based on outdated data; and
   based on the detecting of the incompatibility, cause the outdated data of the first device to be updated.

10. The XR HMD of claim 1, the control circuitry further configured to:
    detect a context of the application provided via the XR HMD; and
    based on the context, modify the first device to receive input corresponding to the context.

11. The XR HMD of claim 1, wherein the control circuitry is further configured to cause the first device to be locked based at least in part on receiving an indication of input from the first device.

12. The XR HMD of claim 1, wherein the control circuitry further configured to:
   determine a distance between the first device and the XR HMD;
   determine that the distance exceeds a threshold; and
   based at least on part on the determining that the distance exceeds the threshold, display on a display of the XR HMD a notification.

13. The XR HMD of claim 1, wherein the control circuitry is further configured to:
   determine a distance between the first device and the XR HMD;
   based at least in part on the distance, select an input field displayed on the XR HMD; and
   perform the action in relation to the application by causing the input received from the first device to be input into the selected input field.

14. A method comprising:
   providing an application to a user wearing an XR HMD wherein the application is associated with an input type;
   detecting a plurality of devices proximate to the XR HMD;
   determining respective input capabilities for each device of the plurality of devices;
   selecting a first device of the plurality of devices to connect to the XR HMD based on determining that the respective input capabilities of the first device match the input type associated with the application;
   causing the first device to be unlocked;
   receiving an indication of input from the first device; and
   based at least in part on the received indication of input, performing an action in relation to the application being provided via the XR HMD.

15. The method of claim 14, further comprising causing the first device to enter a low power mode, wherein a display of the mobile first device is powered off when the first device is in the low power mode, and wherein the input from the first device is input while the first device is in the low power mode.

16. The method of claim 14, further comprising outputting a user interface from the mobile device as an overlay on the XR HMD.

17. The method of claim 14, wherein causing the first device to be unlocked comprises identifying facial features of the user based on biometric data of at least a portion of a face of the user captured by a sensor of the XR HMD, and wherein the first device authenticates the user based on the captured biometric data.

18. The method of claim 14, wherein causing the first device to be unlocked is based at least in part on a generated encoding, wherein the generated encoding is indicative of the captured biometric data.

19. The method of claim 14, further comprising:
   detecting an opportunity for input in the application provided via the XR HMD;
   enabling input on the first device in relation to the application provided via the XR HMD for a limited time following the detecting of the opportunity for input; and
   wherein the receiving the indication of input from the first device is during the limited time.

20. The method of claim 19, wherein enabling input on the first device comprises enabling only input of a specific input type on the mobile device during the limited time.

* * * * *